United States Patent [19]

Ishii et al.

[11] Patent Number: 5,719,636
[45] Date of Patent: Feb. 17, 1998

[54] LETTER-BOX SCREEN DETECTION APPARATUS

[75] Inventors: Satoyuki Ishii; Tsutomu Fujishima, both of Kumagaya; Shigeki Kamimura, Fukaya, all of Japan

[73] Assignee: Kabushiki Kaisha Toshiba, Kawasaki, Japan

[21] Appl. No.: 578,708

[22] PCT Filed: Apr. 28, 1995

[86] PCT No.: PCT/JP95/00851

§ 371 Date: Dec. 28, 1995

§ 102(e) Date: Dec. 28, 1995

[87] PCT Pub. No.: WO95/30303

PCT Pub. Date: Nov. 9, 1995

[30] Foreign Application Priority Data

| Apr. 28, 1994 | [JP] | Japan | 6-091146 |
| Apr. 28, 1994 | [JP] | Japan | 6-091148 |
| Apr. 28, 1994 | [JP] | Japan | 6-091232 |
| Apr. 28, 1994 | [JP] | Japan | 6-091233 |

[51] Int. Cl.$^6$ ................................................. H04N 5/46
[52] U.S. Cl. ....................................... 348/558; 348/913
[58] Field of Search ............................. 348/556, 558, 348/913, 604; H04N 5/46

[56] References Cited

U.S. PATENT DOCUMENTS

| 5,309,234 | 5/1994 | Kranawetter | 348/913 |
| 5,486,871 | 1/1996 | Filliman | 348/558 |

FOREIGN PATENT DOCUMENTS

| 63-193779 | 8/1988 | Japan . |
| 2-214387 | 8/1990 | Japan . |
| 5-161089 | 6/1993 | Japan . |
| 5-292423 | 11/1993 | Japan . |
| 5-328160 | 12/1993 | Japan . |
| 6-245165 | 9/1994 | Japan . |
| 91/19390 | 12/1991 | WIPO . |

*Primary Examiner*—Sherrie Hsia
*Attorney, Agent, or Firm*—Cushman Darby & Cushman IP Group of Pillsbury Madison & Sutro LLP

[57] ABSTRACT

The DC level of the low-frequency component of a horizontal frequency is detected from a video signal by a horizontal LPF 16d and a DC value detection circuit 16g. In addition, the high-frequency component of the horizontal frequency is detected from the video signal by a horizontal BPF 16e and a nonlinear circuit 16h. Furthermore, a high-frequency component in the vertical direction is detected from the video signal by a vertical BPF 16f and a nonlinear circuit 16i. On the basis of three detection results, the presence/absence of a non-image portion of the video signal is determined by a determination circuit 16j.

6 Claims, 25 Drawing Sheets

VISTA SIZE

CINEMASCOPE

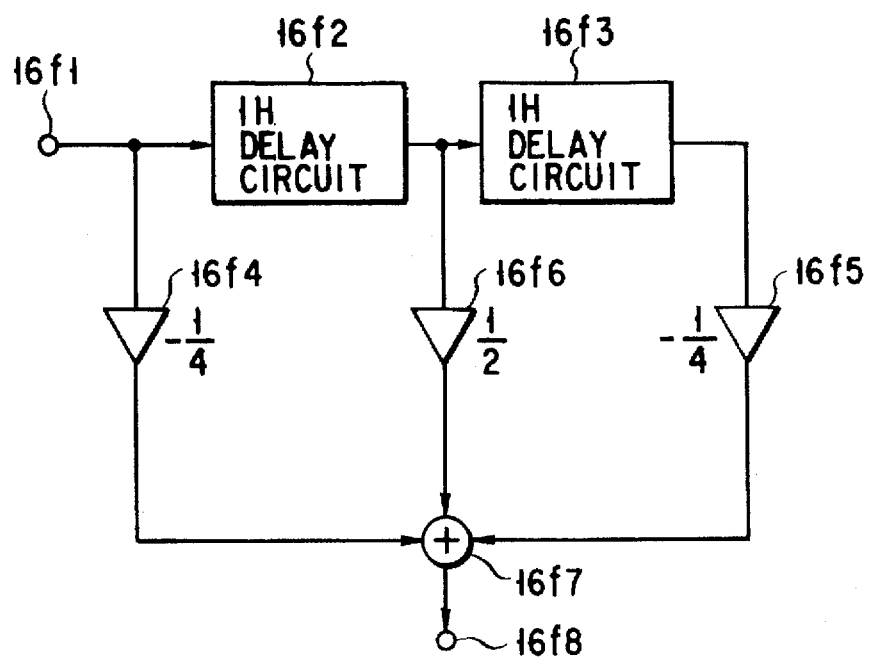
F I G. 9
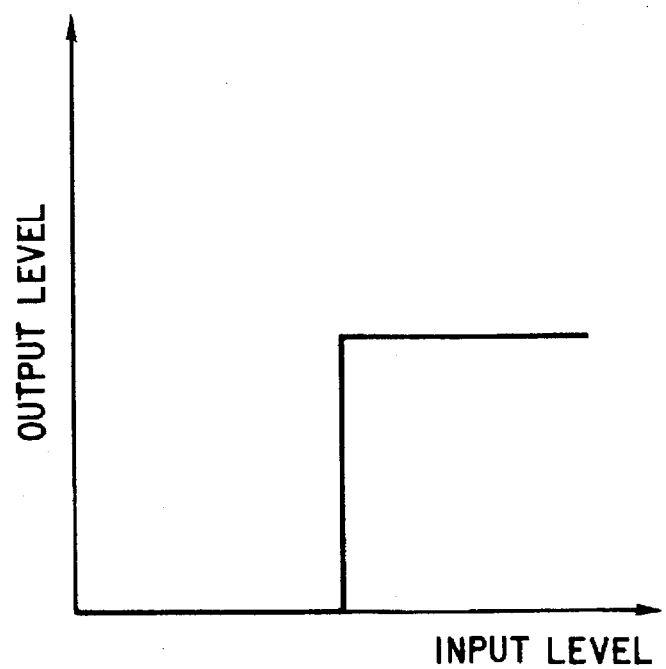
F I G. 10

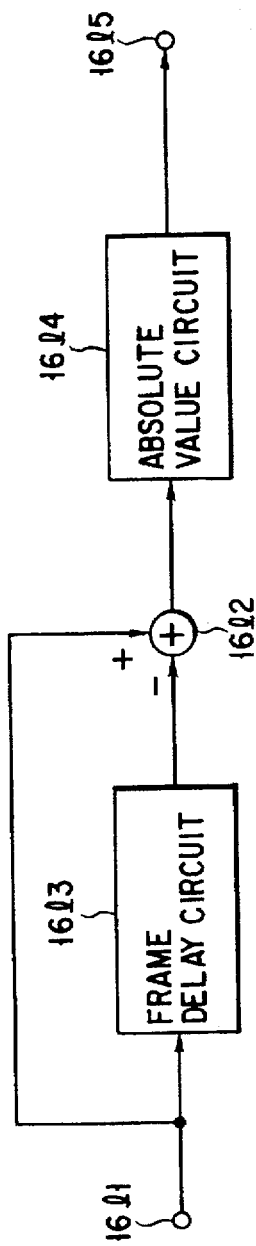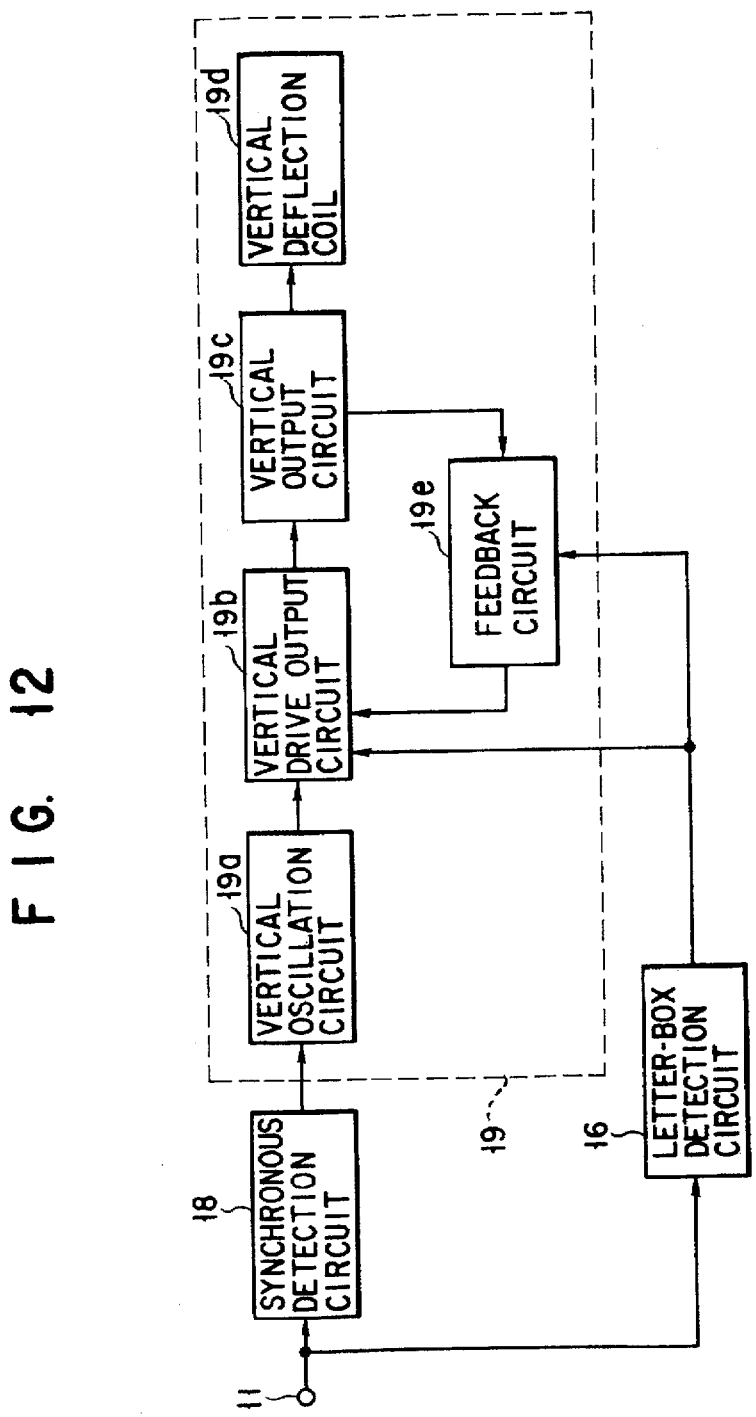
FIG. 12
FIG. 13

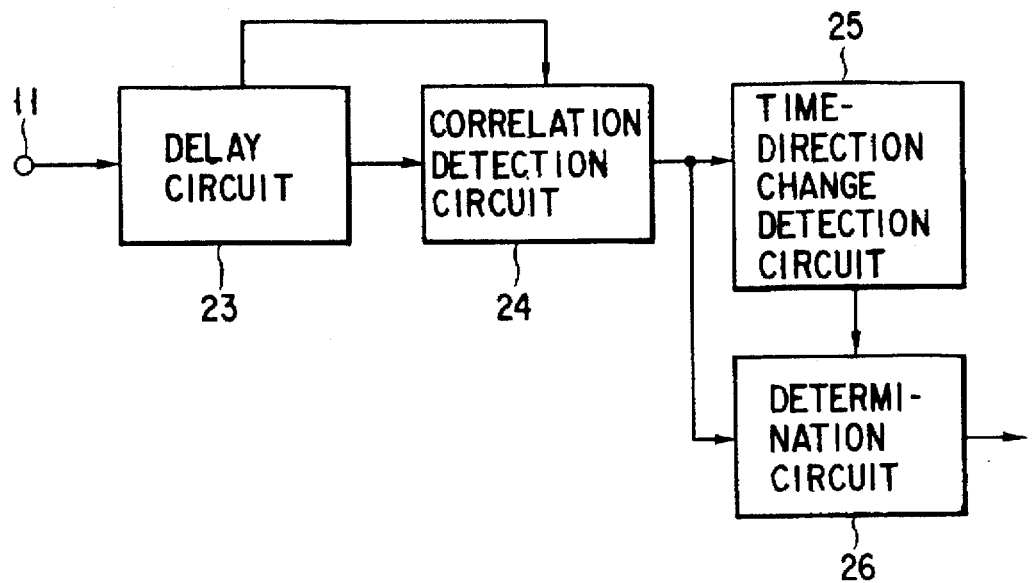
F I G. 14
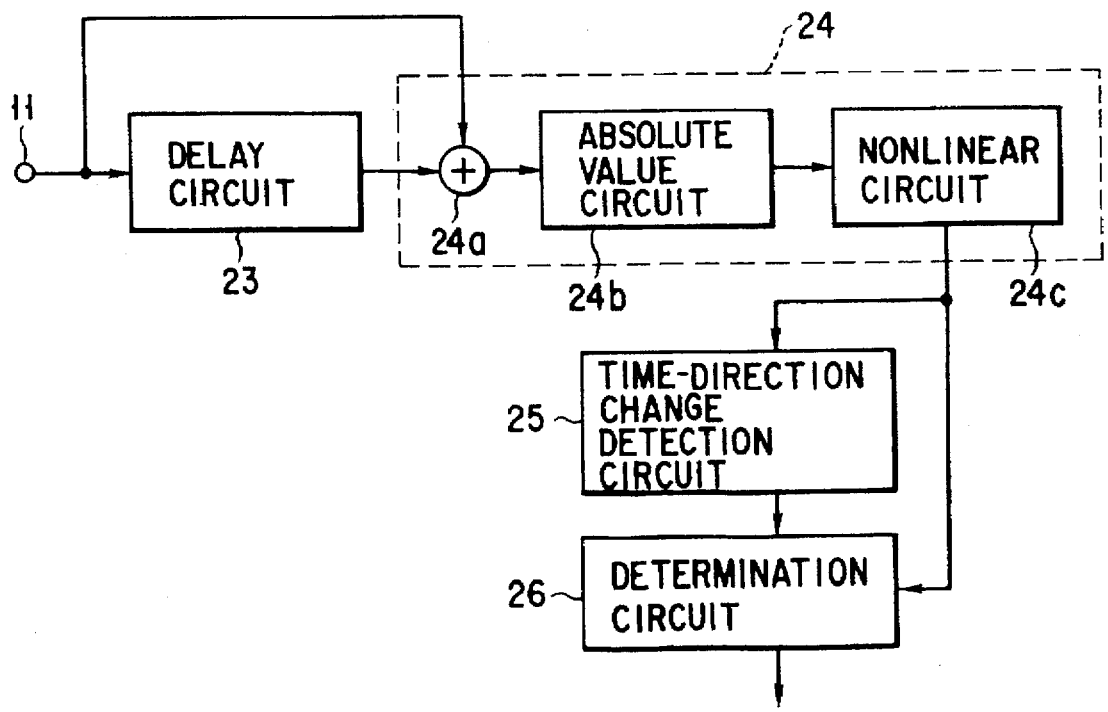
F I G. 15

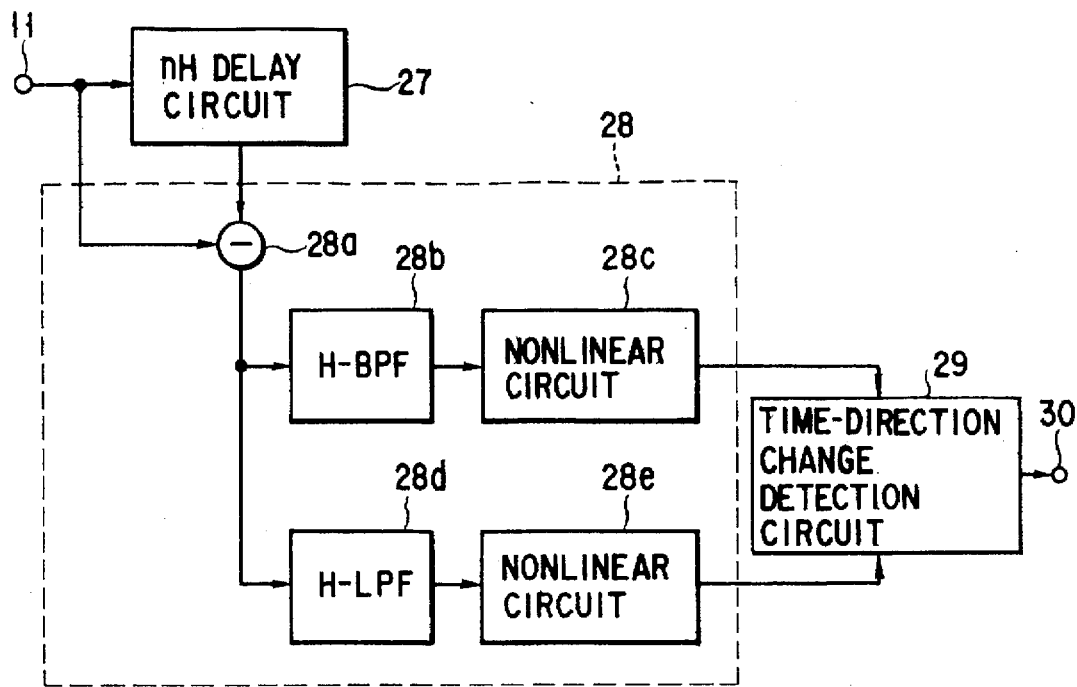
F I G. 18
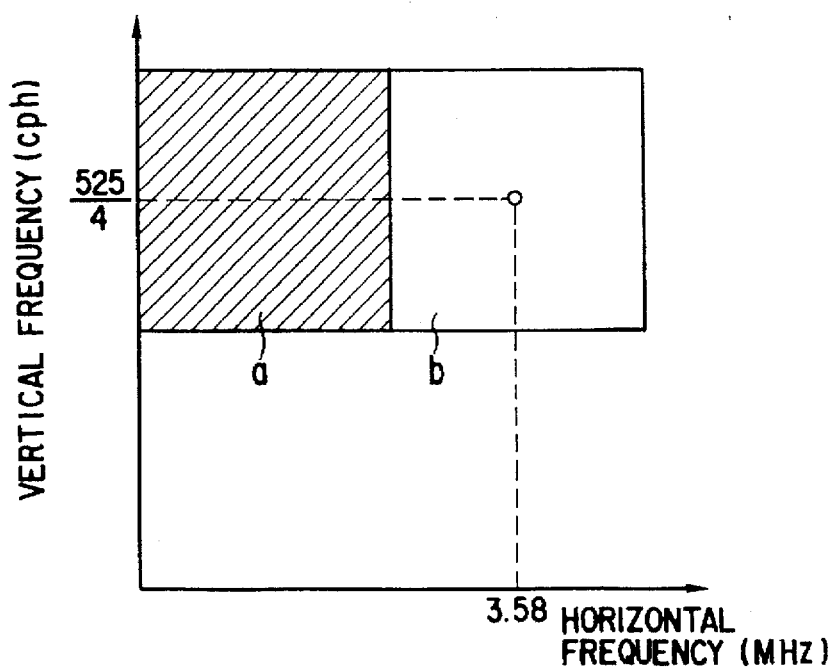
F I G. 19

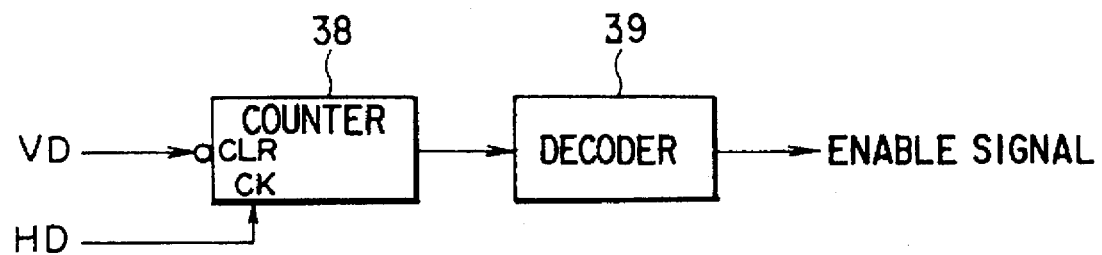
F I G. 22
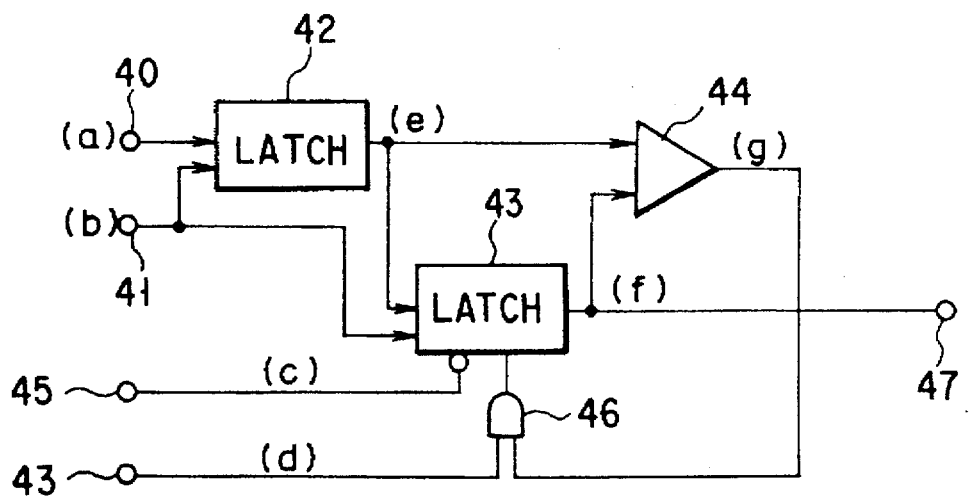
F I G. 23

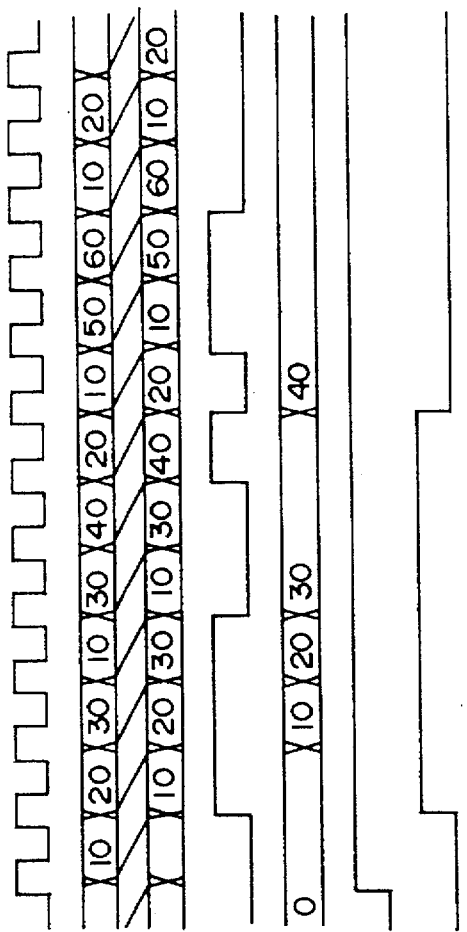
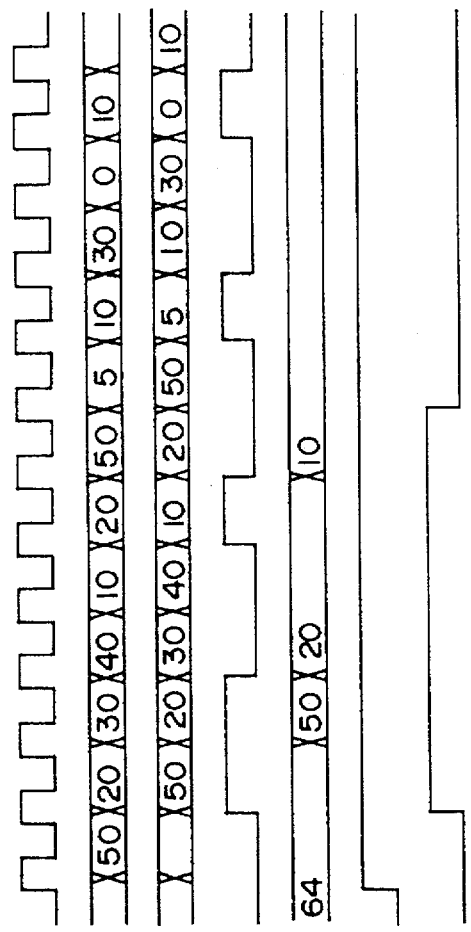

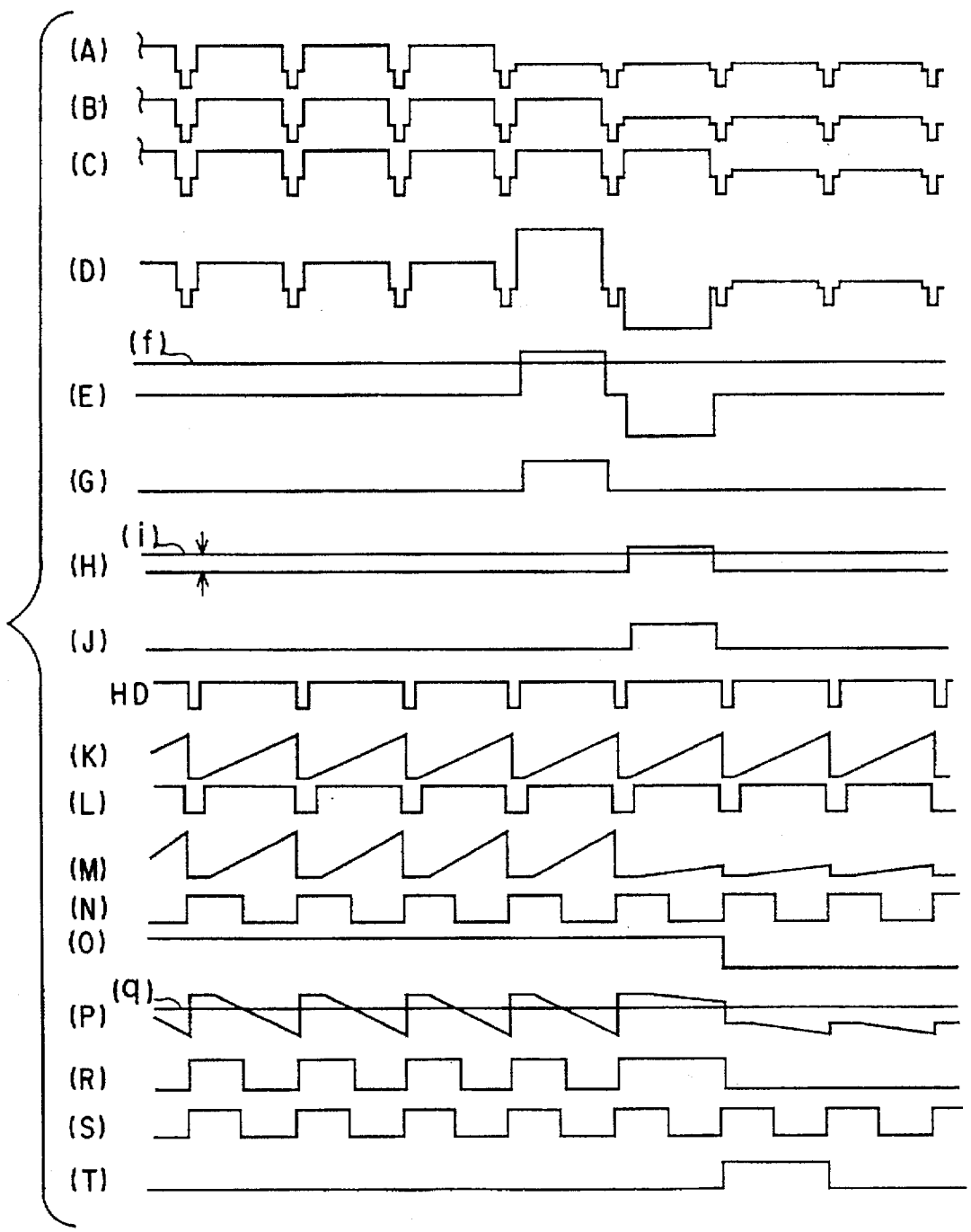
F I G. 34

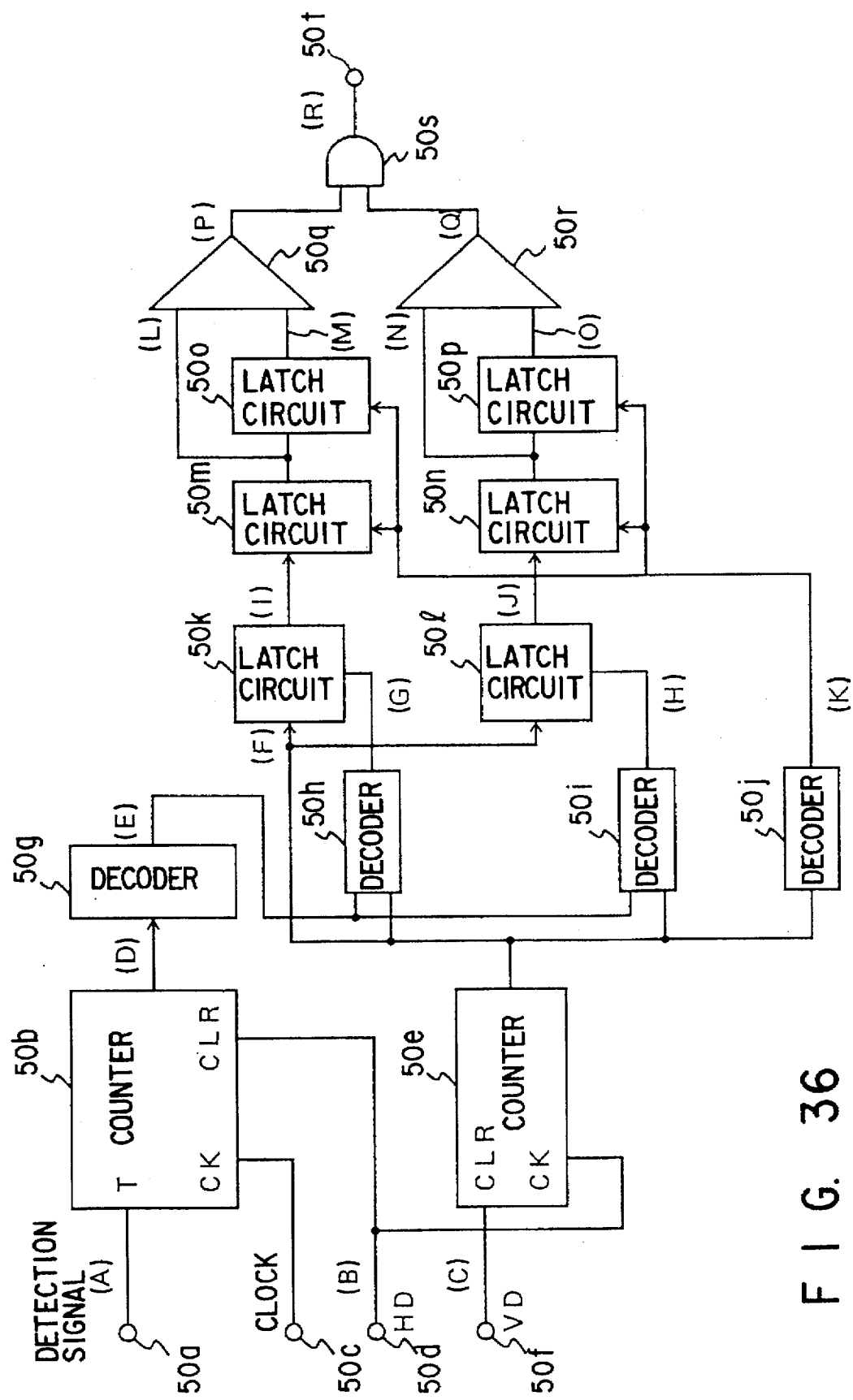
F I G. 36

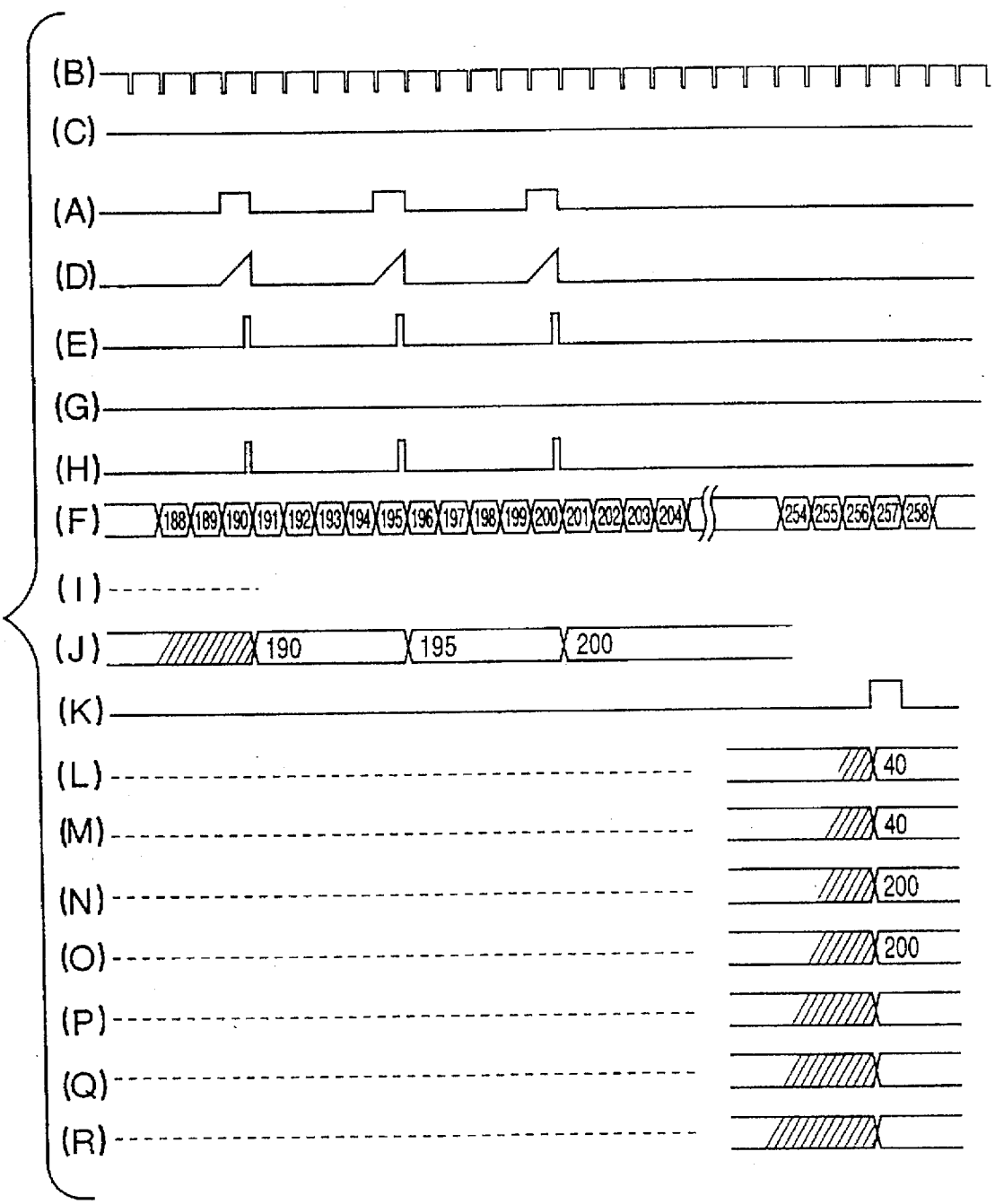
F I G. 38

5,719,636

LETTER-BOX SCREEN DETECTION APPARATUS

TECHNICAL FIELD

The present invention relates to a video display system capable of selectively displaying video signals of a plurality of types with different aspect ratios on a screen and, more particularly, to an improvement of a letter-box screen detection apparatus for determining whether a video signal to be displayed on the screen is a letter-box screen.

BACKGROUND ART

As is well known, for the NTSC (National Television System Committee) system which is one of conventional television broadcasting systems, the aspect ratio of a video signal is defined as 4:3. On the other hand, high-definition (high-vision) television systems have been developed recently. As leading high-definition television systems, there are the MUSE (Multiple Sub-Nyquist Sampling Encoding) system, the EDTV (Extended Definition Television) system as an improved NTSC system, and the like.

In such a high-definition television system, the aspect ratio of a video signal is being settled at 16:9. For this reason, even in a field of television sets for displaying a video signal, apparatuses called wide TVs (Television) capable of displaying a wide screen are rapidly spreading recently.

Many packaged software such as video tapes and laser disks which record video signals with aspect ratios wider than 4:3, such as movie sizes, are commercially available. Video software of this type often has a display form called a letter-box screen as shown in FIG. 1, in which black non-image portions P1 and P2 without any video are inserted above and below a main screen S in display on a screen with an aspect ratio of 4:3.

The video software having a wide screen are expected to increase in the future. In this case, video signals having various aspect ratios of 4:3, 16:9, or a movie size are present, and this poses a problem. In fact, there are letter-box screens of various types, i.e., videos having various aspect ratios and various display forms.

For example, FIGS. 2A and 2B show two types of movie software having an aspect ratio of 1.85:1, i.e., a so-called vista size but different subtitle positions. FIGS. 2C and 2D show two types of movie software having an aspect ratio of 2.35:1, i.e., a so-called cinemascope size but different subtitle positions. In addition, the display form variously changes in accordance with the number of subtitle lines, or domestic or foreign movie software. Dubbed software need no subtitle, and its display form changes accordingly. For example, the number of lines of an upper-side non-image portion varies from about 10 to 50.

In a conventional wide TV, various display means have been examined to cope with the above-mentioned various wide video software. For example, FIG. 3A shows a mode (normal mode) in which non-image portions are formed on the left and right sides of a video. FIG. 3B shows a mode (zoom mode) in which a video image is extended in the vertical and horizontal directions to display the horizontal video region on the display screen to its horizontal limit while cutting the upper and lower portions of the video. FIG. 3C shows a mode (live mode) in which the horizontal video region of a video is displayed on the display screen to its horizontal limit while the vertical video region is extended at a certain ratio. FIG. 3D shows a mode (full mode) in which a video is extended only in the horizontal direction, thereby displaying the video region on the display screen to its horizontal limit.

When a letter-box screen video signal is to be displayed on a wide TV, the video signal is displayed in any one of the above four modes. In the normal mode, however, a region where the video is actually displayed is small, so advantages in large screen display decrease. In the zoom mode, the upper and lower portions of the video with an aspect ratio of 4:3 is cut. However, since these cut portions have no picture pattern from the first, no problem is particularly posed. In the zoom mode, the picture pattern portion is rather conveniently displayed on the screen to its limit.

However, in, e.g., movie software, when a video signal having a subtitle at the lower portion of the screen, or a video signal having a picture pattern portion shifted to the upper or lower side is to be displayed, important picture pattern information may be missed in the zoom mode. In this case, processing for changing the extension ratio or vertically moving the displayed picture pattern must be performed. In any case, since the cutting ratio of the upper and lower portions of the video is large in the zoom mode, adjustment or the like is required.

In the live mode, the upper and lower portions of a video with an aspect ratio of 4:3 are slightly cut, and the circularity is slightly extended in the horizontal direction. However, since the upper and lower cut portions of the video are smaller than those in the zoom mode, adjustment such as picture pattern movement need not be performed. Additionally, in the live mode, the picture pattern is slightly elongated in the horizontal direction, though no serious problem is posed. In the full mode, a video with an aspect ratio of 4:3 is not cut at all. However, as compared to the live mode, the picture pattern is elongated in the horizontal direction. For this reason, the full mode can hardly be positively employed.

In any of the above-described display modes, the viewer must perform adjustment such as switching the mode while viewing the picture pattern displayed on the screen. More specifically, the viewer must perform an operation for selecting an optimum display mode every time the aspect ratio of an input video signal changes.

Conventionally, a means have been developed in which the horizontal and vertical amplitude levels of a TV set are automatically controlled in accordance with the aspect ratio of video software. For example, Japanese Patent Application No. 63-193779 describes a technique for detecting a letter-box screen, in which a clock counter is operated to detect a blanking (non-image portion) width while the luminance signal level is lower than a predetermined DC voltage level, and if a vertical sync signal is detected during this blanking period, a non-image portion is determined.

As described above, in video software having a letter-box screen, blanking (non-image portion) periods are present above and below the screen. However, the luminance signal level of this non-image portion period is not particularly defined, and various levels can be detected. In an actual examination of video software with various letter-box screens, the luminance signal levels during the non-image portion period often increase to almost 15 (IRE). Since the black level in the NTSC system is 5 (IRE) as broadcasting standard, these signal levels are higher than the black level.

On the other hand, even in video software with an aspect ratio of 4:3, the luminance signal level in a dark screen decreases to the black level, as a matter of course. Particularly, in a dark normal screen with an aspect ratio of 4:3 in dark red or blue, a lot of video signals at levels lower than the signal level of a non-image portion are present. For this reason, when a letter-box screen is determined only on the basis of the luminance signal level of an upper/lower non-image portion, erroneous determination tends to occur.

In, e.g., a wide TV screen, when a video with an aspect ratio of 4:3, which is originally displayed as shown in FIG. 4A, is erroneously determined as a letter-box video, the vertical amplitude level is increased, and the upper and lower ends of the picture pattern are omitted, as shown in FIG. 4B. When a letter-box video is erroneously determined as a video with an aspect ratio of 4:3, the display screen cannot be effectively used.

In a letter-box signal shown in FIG. 5A, a vertical sync period, a vertical blanking period, and non-image periods are represented by z, y, s, and t, respectively. Generally, when the time constant is insufficient in an AC (alternate current) coupling circuit, a sag occurs, as shown in FIG. 5B. More specifically, in the letter-box signal, the DC voltage level monotonously increases at the upper and lower non-image portions s and t and during the vertical blanking period Z while the DC voltage level monotonously decreases at the image portion. When the waveform of this letter-box signal is simply sliced with a DC voltage, a slice level indicated by a broken line in FIG. 5B crosses the non-image portion periods s and t, so the presence/absence of the non-image portion cannot be properly detected.

However, such a sag sometimes occurs in a signal source of a VTR (Video Tape Recorder) or a laser disk player and cannot always be coped with a TV set. For this reason, an apparatus which properly determines the non-image portion periods s and t even in a signal waveform with a sag and controls the vertical amplitude level or the horizontal amplitude level is desired.

When a letter-box screen video signal is poor in quality, it is difficult to determine the letter-box screen. FIG. 6A shows an example in which the clamp performance is degraded midway along a video signal transmission line, resulting in variations in DC component. For a video signal in this case, the edge portion of the upper/lower non-image portion is largely lifted. For this reason, the lifted portion cannot be determined as a vertical blanking period and is erroneously determined as a screen with an aspect ratio of 4:3. FIG. 6B shows an example in which noise of an AC component is included in a video signal. In this case as well, the upper/lower portion becomes bright or dark and is erroneously determined as a screen with an aspect ratio of 4:3. FIG. 6C shows an example in which noise of a control signal multiplexed in video software, or noise in head switching of a VTR is included. In this case as well, a discontinuity is determined on the basis of the continuity of the vertical blanking level, and the signal is erroneously determined as a screen with an aspect ratio of 4:3.

As described above, the conventional detection means for detecting a letter-box screen determines only on the basis of the luminance signal level whether non-image portions are present above and below the screen. Therefore, erroneous determination tends to occur. It is strongly demanded to properly determine the presence/absence of a non-image portion even in a video signal with a sag. In addition, even when the vertical blanking level of a video signal varies, or a discontinuity occurs due to noise, it is necessary to properly determine a letter-box screen.

The present invention has been made in consideration of the above situation, and has as its object to provide an excellent letter-box screen detection apparatus which can properly determine the presence/absence of a non-image portion and perform determination of a letter-box screen at a high accuracy.

DISCLOSURE OF INVENTION

According to the present invention, there is provided a letter-box screen detection apparatus comprising first detection means for detecting a DC level of a low-frequency component of a horizontal frequency from a video signal, second detection means for detecting a high-frequency component of the horizontal frequency from the video signal, third detection means for detecting a high-frequency component in a vertical direction from the video signal, and determination means for determining the presence/absence of a non-image portion of the video signal on the basis of detection results from the first to third detection means.

According to this arrangement, the presence/absence of a non-image portion is determined on the basis of the DC level of the horizontal low-frequency component, the horizontal high-frequency component, and the vertical high-frequency component of a video signal. Therefore, the presence/absence of a non-image portion can be properly determined even in a video signal with a sag, and determination of a letter-box screen can be performed at a high accuracy.

According to the present invention, there is also provided a letter-box screen detection apparatus comprising correlation detection means for detecting the presence/absence of a correlation in a vertical direction of a video signal, time change detection means for detecting the presence/absence of a change along the time axis in detection signal output from the correlation detection means, and determination means for determining the presence/absence of a non-image portion of the video signal on the basis of a detection result from the time change detection means.

According to this arrangement, in a video signal having non-image portions added above and below the screen, a correlation is present in the vertical direction of the upper/lower non-image portion, and this correlation is stable along the time axis. Therefore, when the correlation in the vertical direction of the video signal is detected, and a change in correlation along the time axis is detected, the presence/absence of a non-image portion can be properly determined even in a video signal with a sag, and determination of a letter-box screen can be performed at a high accuracy.

According to the present invention, there is also provided a letter-box screen detection apparatus comprising maximum value level holding means for detecting and holding a maximum value level of a portion corresponding to an upper/lower non-image portion of a letter-box screen of a video signal, minimum value level holding means for detecting and holding a minimum value level of the portion corresponding to the upper/lower non-image portion of the letter-box screen of the video signal, arithmetic means for calculating a level difference between the maximum value level held by the maximum value level holding means and the minimum value level held by the minimum value level holding means, detection means for performing level comparison between the level difference obtained by the arithmetic means and a predetermined reference level to detect a non-image portion of the video signal, and determination means for determining the letter-box screen by detecting that a state detected by the detection means as the non-image portion continues for a time longer than a predetermined period.

According to this arrangement, the maximum value level and the minimum value level of a portion corresponding to an upper/lower non-image portion of the letter-box screen of a video signal are detected, and level comparison between the level difference and a reference level is performed to detect the non-image portion of the video signal. When this detection state continues for a time longer than a predetermined period, a letter-box screen is determined. Therefore, even when letter-box screens have various display forms and signal levels at the upper/lower non-image portion, and the signal level at the non-image portion is higher than a vertical blanking level, no erroneous determination occurs, and determination of a letter-box screen can be performed at a high accuracy.

According to the present invention, there is also provided a letter-box screen detection apparatus comprising delay means for delaying a video signal by a predetermined number of horizontal lines, vertical change amount detection means for calculating a difference between the video signal input to the delay means and the video signal delayed by the delay means and comparing a difference value with a predetermined reference value to detect a non-image portion of the video signal, and determination means for determining a letter-box screen when a state detected by the vertical change amount detection means as the non-image portion is obtained at identical horizontal line positions for several continuous fields.

According to this arrangement, arrival of a letter-box screen can be determined by arranging the means for determining that the signal level of a video signal changes beyond a predetermined value, and a specific region to which this changed line belongs. For this reason, the boundary between an upper/lower non-image portion and a picture pattern portion of a letter-box screen can be detected, and the line where the boundary is detected can be found. Therefore, determination of a letter-box screen can be performed at a high accuracy.

BRIEF DESCRIPTION OF DRAWINGS

FIG. 9 is a block diagram showing the details of a vertical BPF in the letter-box detection circuit;

FIG. 10 is a graph showing the input/output characteristics of a nonlinear circuit in the letter-box detection circuit;

FIG. 12 is a block diagram showing the details of a temporal BPF in the modification;

FIG. 13 is a block diagram showing the details of a vertical deflection circuit in the embodiment;

FIG. 14 is a block diagram showing the second embodiment of the present invention;

FIG. 15 is a block diagram showing the details of a correlation detection circuit in the second embodiment;

FIG. 18 is a block diagram showing a modification of the second embodiment;

FIG. 19 is a graph showing the frequency characteristics of a filter in the modification;

FIG. 22 is a block diagram showing an enable signal generation circuit in the third embodiment;

FIG. 23 is a block diagram showing the details of a maximum value level holding circuit and a minimum value level holding circuit in the third embodiment;

FIGS. 24A to 24G are charts for explaining the operation of the maximum value level holding circuit;

FIGS. 25A to 25G are charts for explaining the operation of the minimum value level holding circuit;

FIGS. 28A to 28E are charts for explaining the operation of the letter-box determination circuit, which is performed when a video signal other than a letter-box screen signal is supplied;

FIGS. 34A to 34T are charts continued from FIGS. 33A to 33T along the time axis;

FIG. 36 is a block diagram showing the detail of a letter-box determination circuit in the fourth embodiment;

FIGS. 38A to 38R are charts continued from FIGS. 37A to 37R along the time axis.

BEST MODE OF CARRYING OUT THE INVENTION

Figure 7:
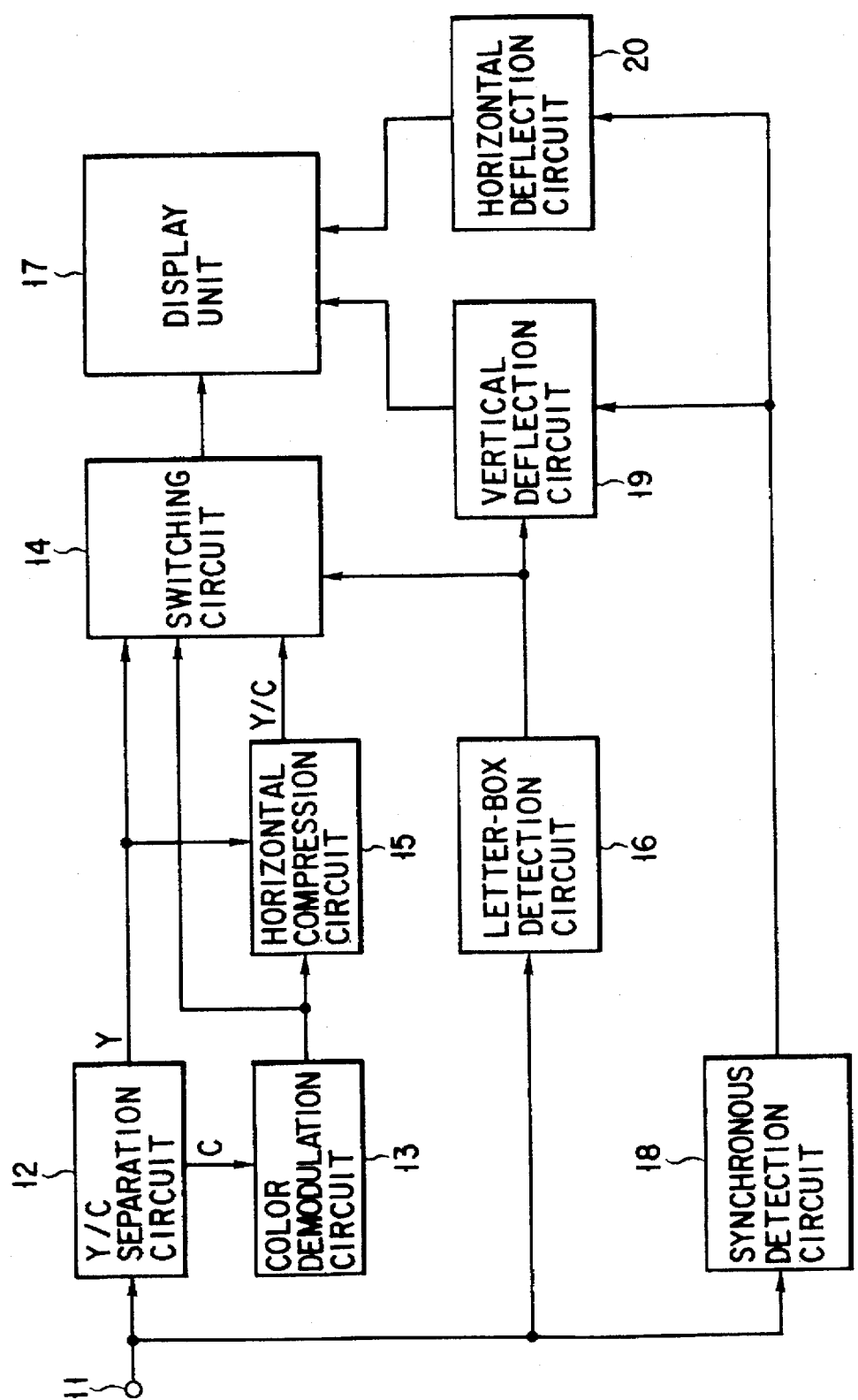
FIG. 7 is a block diagram showing an embodiment of a letter-box screen detection apparatus according to the present invention.

An embodiment of the present invention will be described below in detail with reference to the accompanying drawings. FIG. 7 schematically shows the arrangement of a wide TV set to be described in this embodiment. Referring to FIG. 7, reference numeral 11 denotes an input terminal to which a video signal is supplied. The video signal supplied to this input terminal 11 is supplied to a Y/C (luminance signal/ chrominance signal) separation circuit 12 and separated into a luminance signal Y and chrominance signals C.

The chrominance signals C are supplied to a color demodulation circuit 13 and demodulated, and thereafter, supplied to a switching circuit 14 together with the luminance signal Y. The luminance signal Y output from the Y/C separation circuit 12 and the chrominance signals C demodulated by the color demodulation circuit 13 are supplied to a horizontal compression circuit 15 and compressed in the horizontal direction, and thereafter, supplied to the switching circuit 14.

The video signal supplied to the input terminal 11 is supplied to a letter-box detection circuit 16 (to be described later in detail), and it is detected whether the video signal is a letter-box screen signal, i.e., whether non-image portions are present above and below the screen. The switching circuit 14 is controlled and switched on the basis of a detection signal output from the letter-box detection circuit 16 such that the luminance signal Y output from the Y/C separation circuit 12 and the chrominance signals C demodulated by the color demodulation circuit 13, or the luminance signal Y and the chrominance signals C output from the horizontal compression circuit 15 are selectively guided to a display unit 17 consisting of, e.g., a CRT (Cathode-Ray Tube) with a wide screen structure.

The video signal supplied to the input terminal 11 is supplied to a synchronous detection circuit 18, and vertical and horizontal sync signals are detected. The vertical and horizontal sync signals detected by the synchronous detection circuit 18 are supplied to a vertical deflection circuit 19 and a horizontal deflection circuit 20, respectively, and used to control the display operation of the display unit 17. In this case, the vertical deflection operation of the vertical deflection circuit 19 is controlled on the basis of the detection signal output from the letter-box detection circuit 16.

In the wide TV set to be described in this embodiment, the letter-box detection circuit 16 automatically determines whether the video signal supplied to the input terminal 11 is a letter-box screen signal. Horizontal compression processing or vertical deflection processing is controlled on the basis of the determination result from the letter-box detection circuit 16. With this arrangement, the input video signal is displayed on the display unit 17 in an optimum form.

Figure 8:
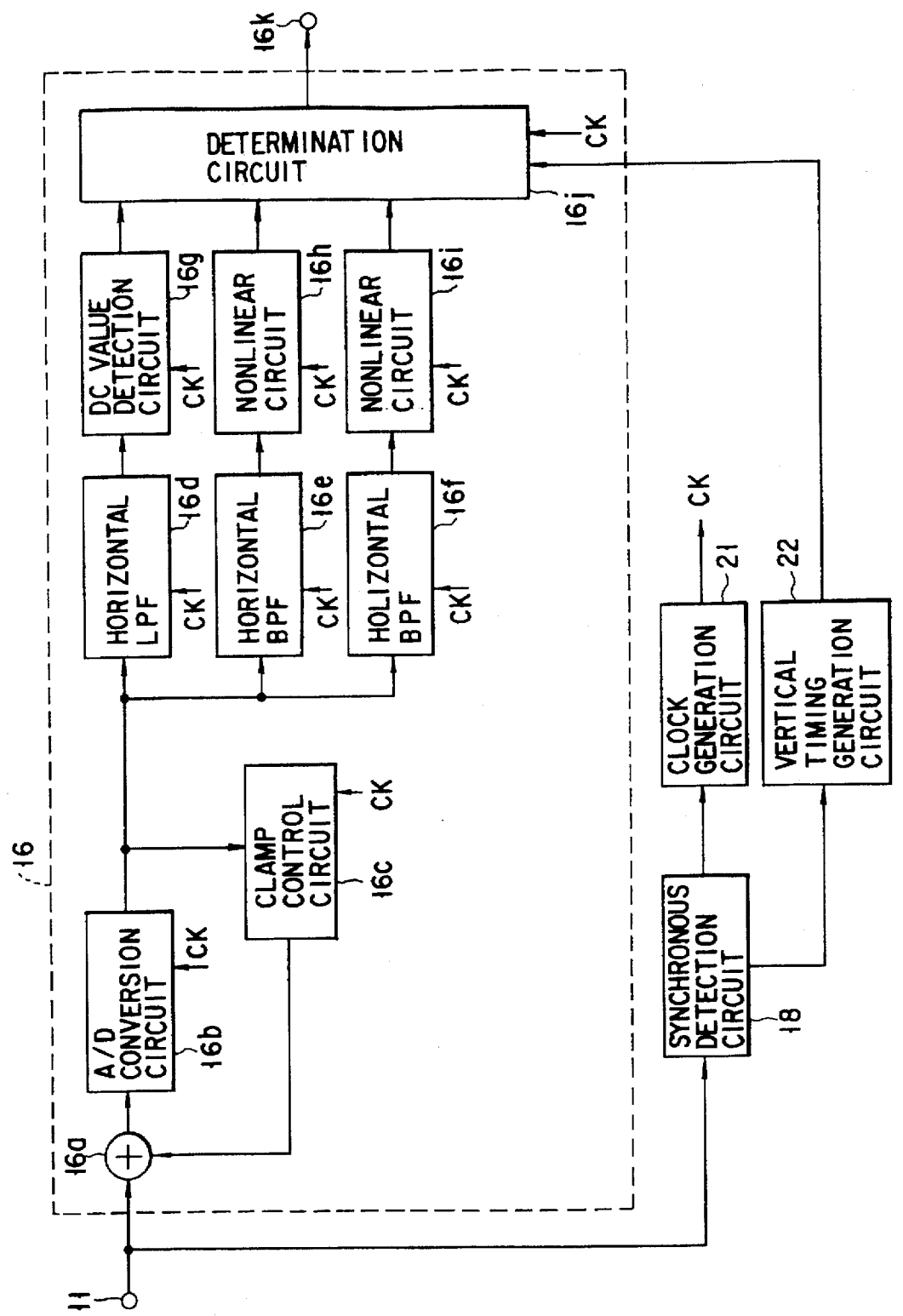
FIG. 8 is a block diagram showing the detail of a letter-box detection circuit in the embodiment.

FIG. 8 shows the detail of the letter-box detection circuit 16. The video signal supplied to the input terminal 11 is supplied to an A/D (analog/digital) conversion circuit 16b through an adding circuit 16a and converted to a digital signal. The video signal converted to a digital signal is supplied to the adding circuit 16a through a clamp control circuit 16c, and simultaneously supplied to a horizontal LPF (low-pass filter) 16d, a horizontal BPF (bandpass filter) 16e, and a vertical BPF 16f.

The clamp control circuit 16c performs level comparison between the pedestal DC (direct current) level of the video signal and a reference level and supplies a DC offset level based on the level difference component to the adding circuit 16a, thereby controlling the pedestal DC level of the video signal to be constant.

The horizontal LPF 16d removes a chrominance carrier included in the video signal to extract a luminance signal. The luminance signal extracted by the horizontal LPF 16d is supplied to a DC value detection circuit 16g. Level comparison between the DC level and a predetermined threshold level is performed to detect a level difference with respect to the threshold level. The passing band of the horizontal BPF 16e is a chrominance carrier band.

For this reason, the chrominance carrier of the input video signal or the horizontal high-frequency component of the luminance signal is detected by the horizontal BPF 16e. A detection result from the horizontal BPF 16 is supplied to a nonlinear circuit 16h and binarized to determine the presence/absence of the component. The component passing through the vertical BPF 16f is binarized by a nonlinear circuit 16i, and the presence/absence of the component is determined.

Detection signals output from the DC value detection circuit 16g and the nonlinear circuits 16h and 16i are supplied to a determination circuit 16j. The determination circuit 16j determines the presence/absence of a non-image portion in a predetermined scanning line on the basis of the DC detection value detected by the DC value detection circuit 16g or the presence/absence of a horizontal BPF component or a vertical BPF component output from the nonlinear circuit 16h or 16i. The determination result is output through an output terminal 16k.

A clock generation circuit 21 generates a clock signal CK necessary for digital signal processing in the letter-box detection circuit 16 on the basis of a sync signal separated from the video signal by the synchronous detection circuit 18. A vertical timing generation circuit 22 generates, on the basis of the sync signal output from the synchronous detection circuit 18, a signal which goes to H (high) level during a period corresponding to a non-image portion s or t of the letter-box video signal, as shown in FIG. 5C, and outputs the signal to the determination circuit 16j.

FIG. 9 shows the details of the vertical BPF 16f. Referring to FIG. 9, reference numeral 16f1 denotes an input terminal to which a digital video signal output from the A/D conversion circuit 16b is supplied. The digital video signal supplied to the input terminal 16f1 is sequentially delayed by one horizontal line by each of two series-connected 1H delay circuits 16f2 and 16f3.

The video signal supplied to the input terminal 16f1 and the video signal output from 1H delay circuit 16f3 are respectively supplied to coefficient circuits 16f4 and 16f5 each having an input/output gain of −¼. The video signal output from the 1H delay circuit 16f2 is supplied to a coefficient circuit 16f6 having an input/output gain of ½. Outputs from the coefficient circuits 16f4, 16f5, and 16f6 are added by an adding circuit 16f7. With this operation, the vertical high-frequency component of the video signal is extracted through an output terminal 16f8.

FIG. 10 shows the input/output characteristics of the nonlinear circuits 16h and 16i. The nonlinear circuits 16h and 16i binarize an input signal and output a signal of a predetermined level when the input amplitude level exceeds a predetermined value. However, the two nonlinear circuits 16h and 16i have different characteristics. A non-image portion has the DC offset component of a luminance signal although a chrominance carrier component, the horizontal high-frequency component, or the vertical high-frequency component of the luminance signal is not present. Therefore, when the presence/absence of these components is detected, the non-image portion detection accuracy can be increased.

Figure 11:
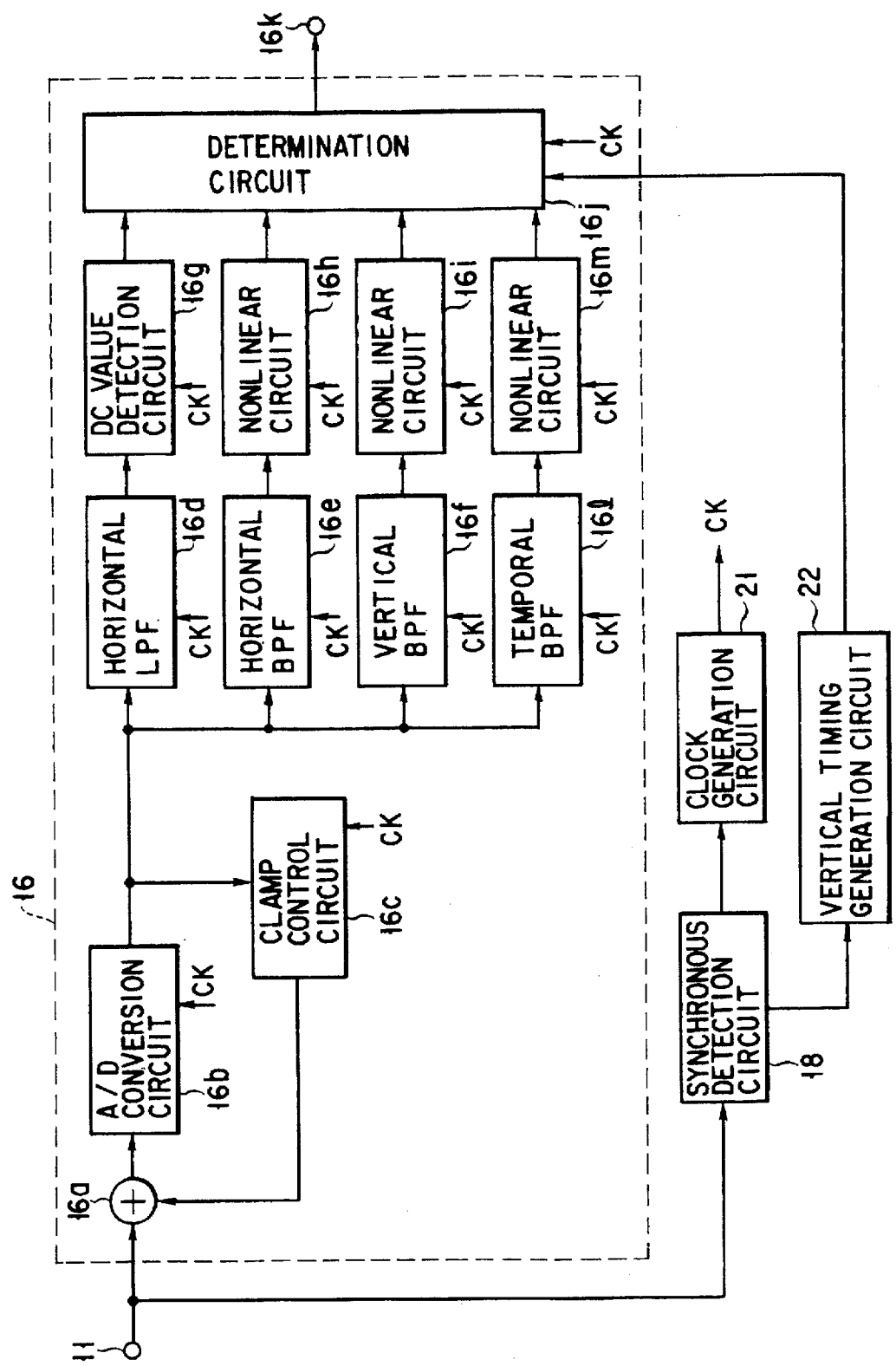
FIG. 11 is a block diagram showing a modification of the letter-box detection circuit.

FIG. 11 shows a modification of the letter-box detection circuit 16 having an arrangement shown in FIG. 8. The same reference numerals as in FIG. 8 denote the same parts in FIG. 11. A digital video signal output from the A/D conversion circuit 16b is supplied to a temporal BPF 16l. The temporal BPF 16l has an arrangement as shown in FIG. 12.

The digital video signal supplied to an input terminal 16l1 is supplied to an arithmetic circuit 16l2, and at the same time, delayed by one frame period by a frame delay circuit 16l3 and supplied to the arithmetic circuit 16l3. The arithmetic circuit 16l2 subtracts the digital video signal delayed by one frame period by the frame delay circuit 16l3 from the digital video signal supplied to the input terminal 16l1, thereby generating a one-frame difference signal.

For this reason, a change in video during one frame is extracted from the arithmetic circuit 16l3 as an interframe difference signal. This interframe difference signal is extracted from an output terminal 16l5 through an absolute value circuit 16l4. That is, in the temporal BPF 16l, a change in input video signal along the time axis is detected. A detection result from the temporal BPF 16l is binarized by a nonlinear circuit 16m and supplied to the determination circuit 16j.

When the upper/lower portion of the screen is a non-image portion, no change occurs in picture pattern along the time axis, so no signal is extracted from the nonlinear circuit 16m. At an image portion, motion of the picture pattern is detected by the temporal BPF 16l, binarized by the nonlinear circuit 16m, and supplied to the determination circuit 16j. In this case, for binarization by the nonlinear circuit 16m, a threshold is set not to respond to noise included in the video signal.

The determination circuit 16j determines a non-image portion on the basis of outputs from the DC value detection circuit 16g and the nonlinear circuits 16h, 16i, and 16m. Some means are available for non-image portion determination by the determination circuit 16j. In the first means, when the output DC level of the horizontal LPF 16d is lower than the threshold level of the DC value detection circuit 16g, and an absent state is detected in which any of the horizontal BPF component, the vertical BPF component, and the time BPF component is not detected, a non-image portion is determined.

In the second means, two threshold levels V1 and V2 (V1<V2) are set as threshold levels of the DC value detection circuit 16g. When the output DC level of the horizontal LPF 16d is lower than the level V1, a non-image portion is determined. When the output DC level of the horizontal LPF 16d is higher than the level V1 and lower than the level V2, and outputs from the nonlinear circuits 16h, 16i, and 16m are in the absent state, it is determined that a non-image portion is present. When the output DC level of the horizontal LPF 16d is higher than the level V2, an image portion is determined.

Figure 5A:
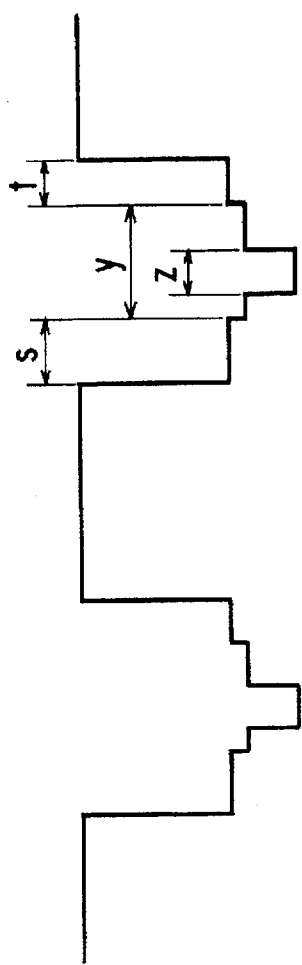
FIGS. 5A to 5D are charts showing waveforms so as to explain a letter-box screen video signal and its sag.
Figure 5B:
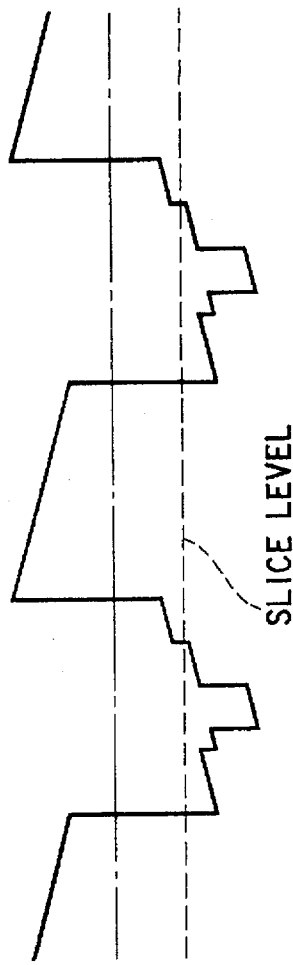
Figure 5C:

When a video signal waveform with a vertical sag as shown in FIG. 5B is input, the first means can prevent erroneous detection by setting the threshold at a level not to respond to a vertical sag, e.g., a level indicated by a chain line in FIG. 5B in advance. Even when a vertical sag is present, an output from the nonlinear circuit 16h is in the absent state because neither chrominance carrier nor horizontal high-frequency component of a luminance signal is present.

Since no vertical high-frequency component is present in the range of non-image portions, an output from the nonlinear circuit 16i is in the absent state.

Since no change along the time axis is detected, an output from the nonlinear circuit 16m is in the absent state. For this reason, a non-image portion can be determined by the determination circuit 16j. Even when all of the horizontal BPF 16e, the vertical BPF 16f, the temporal BPF 16l are not necessarily provided, the detection accuracy can be improved.

FIG. 13 shows the details of the vertical deflection circuit 19 shown in FIG. 7. A vertical sync signal synchronously separated by the synchronous detection circuit 18 is supplied to a vertical oscillation circuit 19a to generate a sawtooth signal synchronized with the vertical sync signal. The sawtooth signal output from the vertical oscillation circuit 19a is supplied to a vertical drive circuit 19b, and waveform shaping and amplification are performed. The sawtooth signal is further amplified by a vertical output circuit 19c and supplied to a vertical deflection coil 19d. A feedback circuit 19e performs negative feedback of an output signal from the vertical output circuit 19c to the vertical drive circuit 19b to maintain the linearity of the sawtooth signal.

Figure 1:
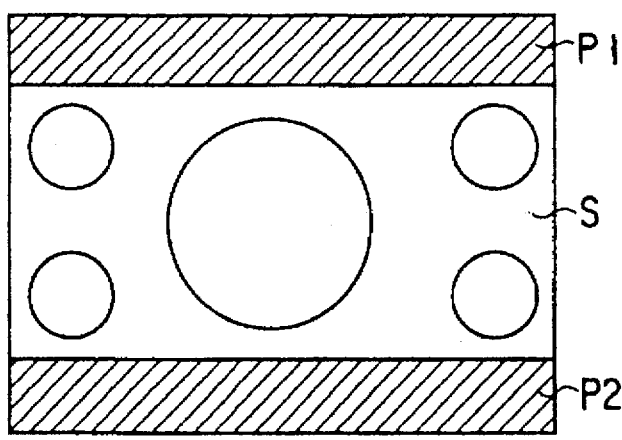
FIG. 1 is a view for explaining a letter-box screen.
Figure 2A:
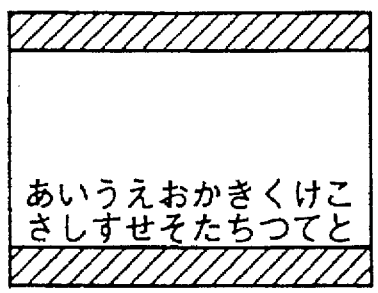
FIGS. 2A to 2D are views for explaining various examples of the letter-box screen.
Figure 2B:
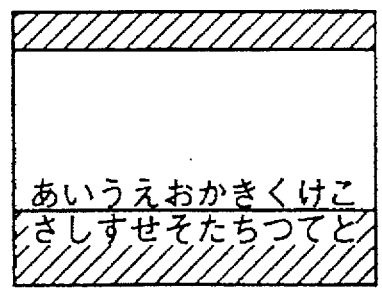
Figure 2C:
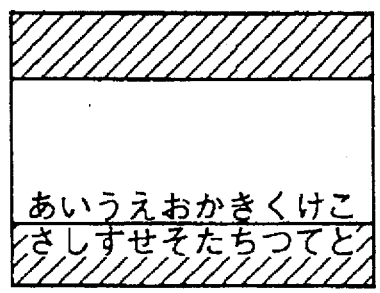
Figure 2D:
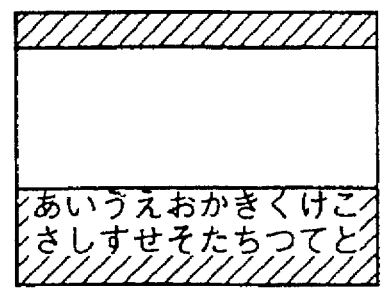
Figure 3A:
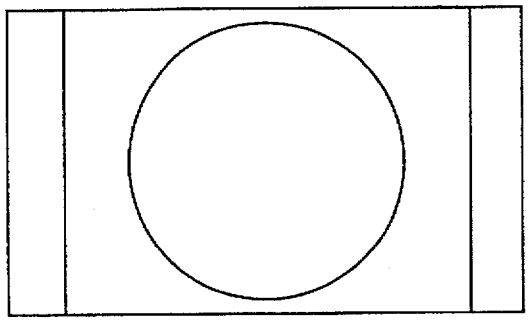
FIGS. 3A to 3D are views for explaining the display modes of a wide TV.
Figure 3C:
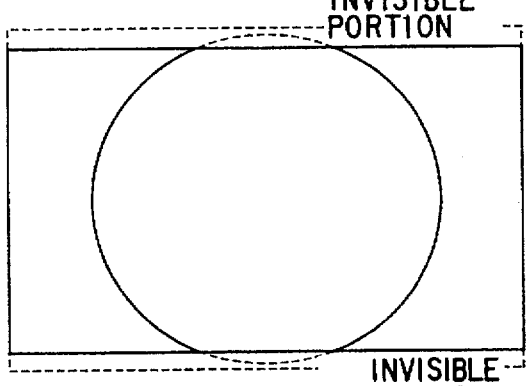
Figure 3B:
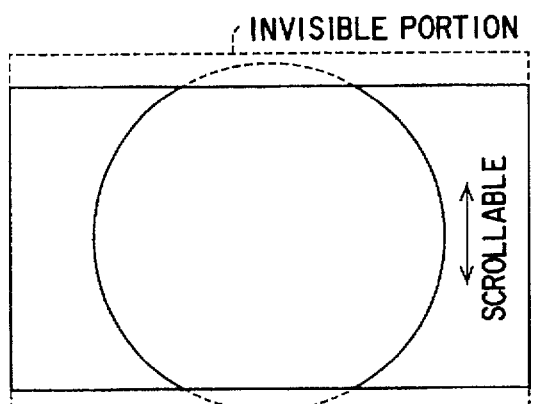
Figure 3D:
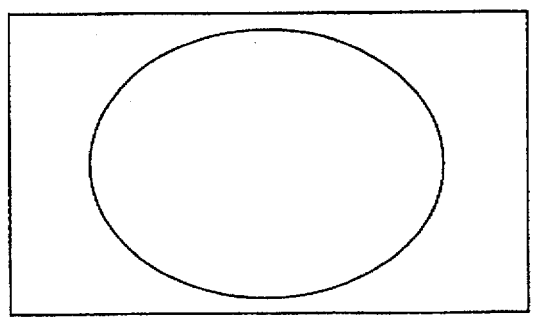
Figure 4A:
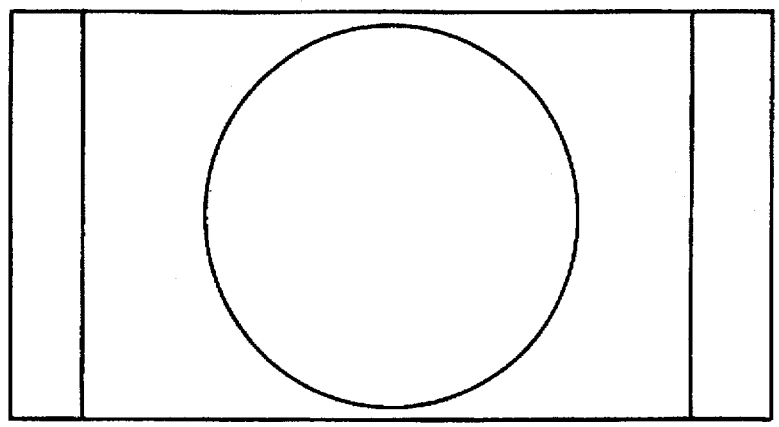
FIGS. 4A to 4C are views for explaining various display forms used when a video signal with an aspect ratio of 4:3 is displayed in the wide TV set.
Figure 4B:
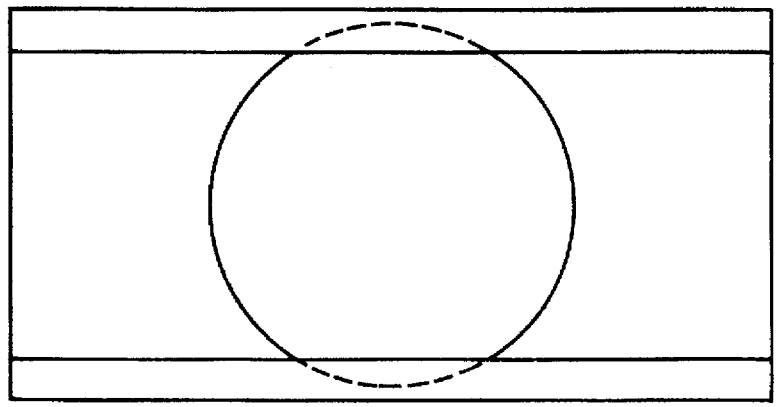
Figure 4C:
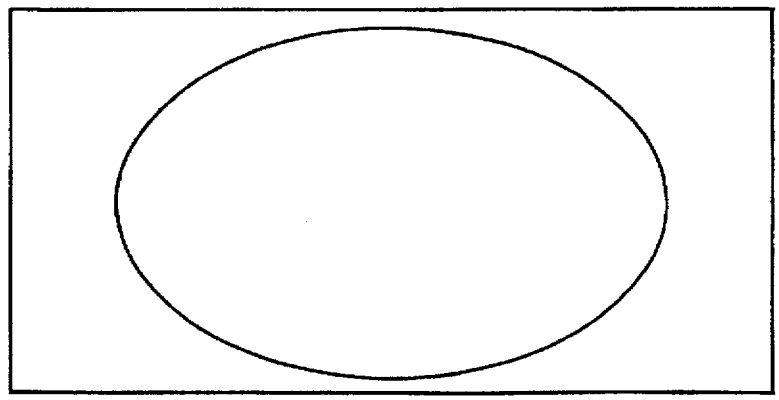

In the vertical deflection circuit 19 shown in FIG. 13, when it is determined by the letter-box detection circuit 16 that non-image portions are present above and below the video signal, the feedback circuit 19e or the vertical drive circuit 19b in the vertical deflection circuit 19 is controlled in accordance with the detection signal, thereby increasing the vertical amplitude of the video signal. In this case, the letter-box detection circuit 16 may control the increase in vertical amplitude temporarily through a microcomputer (not shown). When it is determined by the letter-box detection circuit 16 that no non-image portion is present, the vertical amplitude is controlled such that the upper and lower portions of the screen do not protrude from the display screen, as shown in FIG. 4A or 4C.

FIG. 14 shows the second embodiment of the present invention, in which another arrangement of the letter-box detection circuit 16 is shown. A video signal supplied to an input terminal 11 is supplied to a correlation detection circuit 24 through a delay circuit 23, and at the same time, directly supplied to the correlation detection circuit 24. The delay circuit 23 delays the input video signal by a period corresponding to n (natural number) lines. The correlation detection circuit 24 compares the video signal directly supplied through the input terminal 11 with the video signal supplied through the delay circuit 23, thereby detecting the presence/absence of correlation between the two video signals or the presence/absence of correlation in units of lines.

A correlation detection signal output from the correlation detection circuit 24 is supplied to a determination circuit 26 through a time-direction change detection circuit 25, and at the same time, directly supplied to the determination circuit 26. The time-direction change detection circuit 25 detects whether the correlation detection signal output from the correlation detection circuit 24 changes along the time axis, or the presence/absence of correlation in units of lines changes along the time axis. The determination circuit 26 receives outputs from the correlation detection circuit 24 and the time-direction change detection circuit 25 to determine the presence/absence of the upper/lower non-image portion of the input video signal.

FIG. 15 shows the connection between the internal arrangement of the correlation detection circuit 24 and other blocks. The correlation detection circuit 24 is constituted by a subtraction circuit 24a, an absolute value circuit 24b, and a nonlinear circuit 24c.

Figure 16:
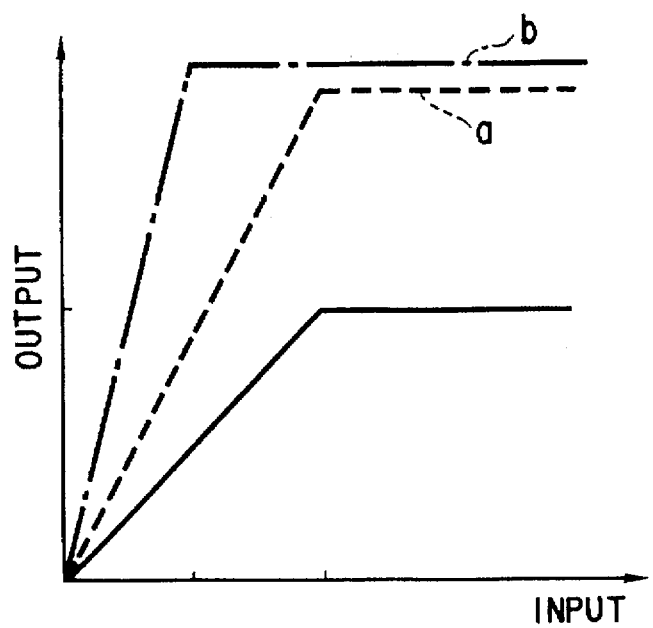
FIG. 16 is a graph showing the input/output characteristics of an absolute value circuit in the correlation detection circuit.

The subtraction circuit 24a calculates the difference between the video signal directly supplied through the input terminal 11 and the video signal output from the delay circuit 23 and outputs the difference signal to the absolute value circuit 24b. The absolute value circuit 24b generates the absolute value of the input difference signal and outputs the absolute value signal to the nonlinear circuit 24c. The nonlinear circuit 24c has input/output characteristics representing that a predetermined value is output when the input signal value exceeds a predetermined value, as shown in FIG. 16.

Figure 17:
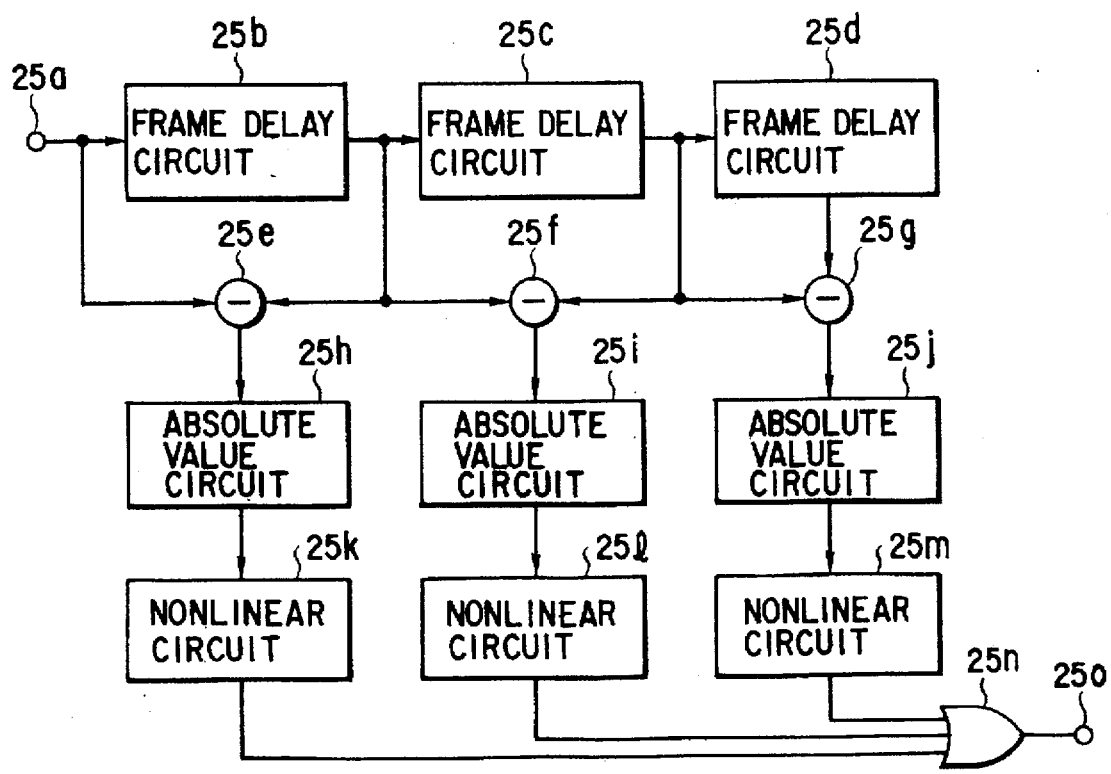
FIG. 17 is a block diagram showing the details of a time-direction change detection circuit in the second embodiment.

FIG. 17 shows the details of the time-direction change detection circuit 25. Referring to FIG. 17, reference numeral 25 denotes an input terminal to which a correlation detection signal output from the correlation detection circuit 24 is supplied. The correlation detection signal supplied to the input terminal 25a is sequentially transferred to three series-connected frame delay circuits 25b, 25c, and 25d.

Subtraction circuits 25e, 25f, and 25g calculate the differences between inputs and outputs of the frame delay circuits 25b, 25c, and 25d, respectively. Outputs from the subtraction circuits 25e, 25f, and 25g pass through absolute value circuits 25h, 25i, and 25j and nonlinear circuits 25k, 25l, and 25m, respectively, are ORed by an OR circuit 25n, and supplied to the determination circuit 26 through an output terminal 25o.

The correlation detection signal output from the correlation detection circuit 24 is supplied to the frame delay circuit 25b through the input terminal 25a and delayed by one frame period. The correlation detection signal output from the frame delay circuit 25b is delayed by one frame by the frame delay circuit 25c and further delayed by one frame by the frame delay circuit 25d. Therefore, the frame delay circuit 25b outputs a signal delayed by one frame, the frame delay circuit 25c outputs a signal delayed by two frames, and the frame delay circuit 25d outputs a signal delayed by three frames with respect to the correlation detection signal supplied to the input terminal 25a.

The subtraction circuit 25e calculates the difference between the correlation detection signal directly supplied from the input terminal 25a and the correlation detection signal delayed by one frame and output from the frame delay circuit 25b, and outputs the difference signal to the absolute value circuit 25h. The absolute value circuit 25h generates the absolute value signal of the input difference signal and outputs the absolute value signal to the nonlinear circuit 25k.

The nonlinear circuit 25k has input/output characteristics as shown in FIG. 10, which binarizes the input absolute value signal and outputs the signal to the OR circuit 25n. In this case, the input/output characteristics of the nonlinear circuit 25k are characteristics for cutting an output smaller than a predetermined value in the input/output characteristics shown in FIG. 16. The absolute value circuits 25i and 25j and the nonlinear circuits 25˜ and 25m have the same arrangements as those of the absolute value circuit 25h and the nonlinear circuit 25k and perform the same operations, so the detailed description thereof will be omitted.

When the correlation detection signal supplied to the input terminal 25a does not change along the time axis, an output from the nonlinear circuit 25k is at L (low) level. For this reason, when the correlation detection signal does not change for three continuous frames, an output from the OR circuit 25n is at L level. However, when the correlation detection signal changes for any one of three continuous frames, an output from the OR circuit 25n is at H level.

In the correlation detection circuit 24 shown in FIG. 15, the presence/absence of vertical high-frequency components preceding and succeeding a vertical sync signal and the presence/absence of a vertical high-frequency component at the boundary between a non-image portion and an image portion can be detected. In a letter-box screen, the vertical high-frequency component exhibits no change along the time axis. However, in a video signal with an aspect ratio of 4:3, a change is observed along the time axis in accordance with a change in image. For this reason, the change along the time axis can be detected by the time-direction change detection circuit 23. The determination circuit 26 determines a letter-box signal when a vertical high-frequency component is present during a predetermined period, and this component does not change along the time axis.

Figure 5D:
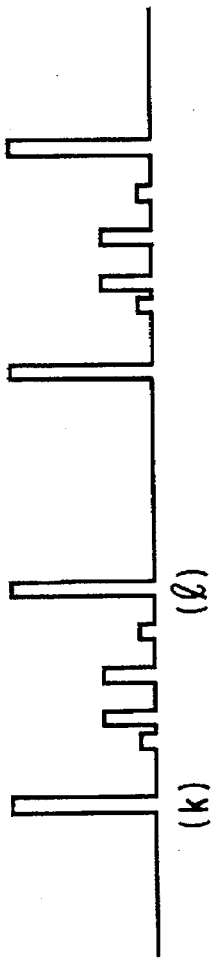

When a video signal with a sag as shown in FIG. 5B is input, a vertical high-frequency signal output from the subtraction circuit 24a shown in FIG. 15 is supplied to the absolute value circuit 24b and detected as a peak value output as shown in FIG. 5D. More specifically, even when a vertical sag is present, the correlation between lines is maintained, and the boundary between a non-image portion and an image portion can be detected.

FIG. 18 shows a modification of the letter-box detection circuit 16 shown in FIG. 14. A video signal supplied to the input terminal 11 is supplied to one input terminal of a subtraction circuit 28a constituting a correlation detection circuit 28 through an nH (n: natural number) delay circuit 27, and at the same time, directly supplied to the other input terminal of the subtraction circuit 28a. The nH delay circuit 27 delays the video signal by a period corresponding to n (natural number) lines. The subtraction circuit 28a subtracts the video signal supplied through the nH delay circuit 27 from the video signal directly supplied through the input terminal 11.

A subtraction signal output from the subtraction circuit 28a is output to one input terminal of a time-direction change detection circuit 29 through an H (horizontal)-BPF 28b and a nonlinear circuit 28c, and at the same time, output to the other input terminal of the time-direction change detection circuit 29 through an H-LPF 28d and a nonlinear circuit 28e. An output from the time-direction change detection circuit 29 is extracted from an output terminal 30 as a letter-box screen determination signal. An region a shown in FIG. 19 represents the vertical-horizontal frequency characteristics of an output signal from the H-LPF 28d. An region b shown in FIG. 19 represents the vertical-horizontal frequency characteristics of an output signal from the H-BPF 28b.

In the arrangement shown in FIG. 18, a change in chrominance carrier component and a change in luminance signal can be detected along the time axis through the nonlinear circuits 28c and 28e, and the detection accuracy can be improved. Generally, the degree of modulation of a chrominance signal is low, and the amplitude of a chrominance carrier component is small. Therefore, when the input/output characteristics of the nonlinear circuit 28c for receiving an output signal from the H-BPF 28b are set as indicated by a broken line a or a chain line b shown in FIG. 16, the detection sensitivity can be increased. Particularly, in a vertical deflection circuit 19, the position of an image portion can be detected from vertical high-frequency signals (k) and (l) preceding and succeeding the vertical sync signal as shown in FIG. 5D. With this arrangement, the vertical amplitude can be extended in the effective display screen to its limit.

Figure 20:
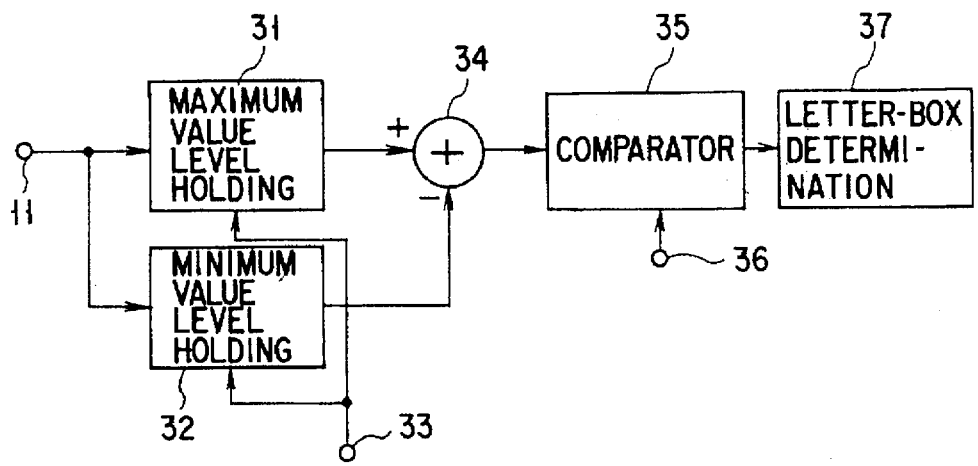
FIG. 20 is a block diagram showing the third embodiment of the present invention.

FIG. 20 shows the third embodiment of the present invention, in which still another arrangement of the letter-box detection circuit 16 is shown. A video signal supplied to an input terminal 11 is supplied to a maximum value level holding circuit 31 and a minimum value level holding circuit 32. The maximum value level holding circuit 31 and the minimum value level holding circuit 32 respectively hold the maximum value level and the minimum value level of the video signal during the H-level period of an enable signal supplied to an input terminal 33.

The maximum value level and the minimum value level of the video signal, which are held by the maximum value level holding circuit 31 and the minimum value level holding circuit 32, respectively, are supplied to an arithmetic circuit 34, and subtraction is performed. The level difference is supplied to a comparator 35. The comparator 35 performs level comparison between the level difference between the maximum value level and the minimum value level and a predetermined reference level supplied to an input terminal 36, thereby detecting the presence/absence of a change in signal level during horizontal and vertical periods corresponding to upper and lower non-image portions of a letter-box screen. The detection result is supplied to a letter-box determination circuit 37 to determine the letter-box screen.

Figure 21:
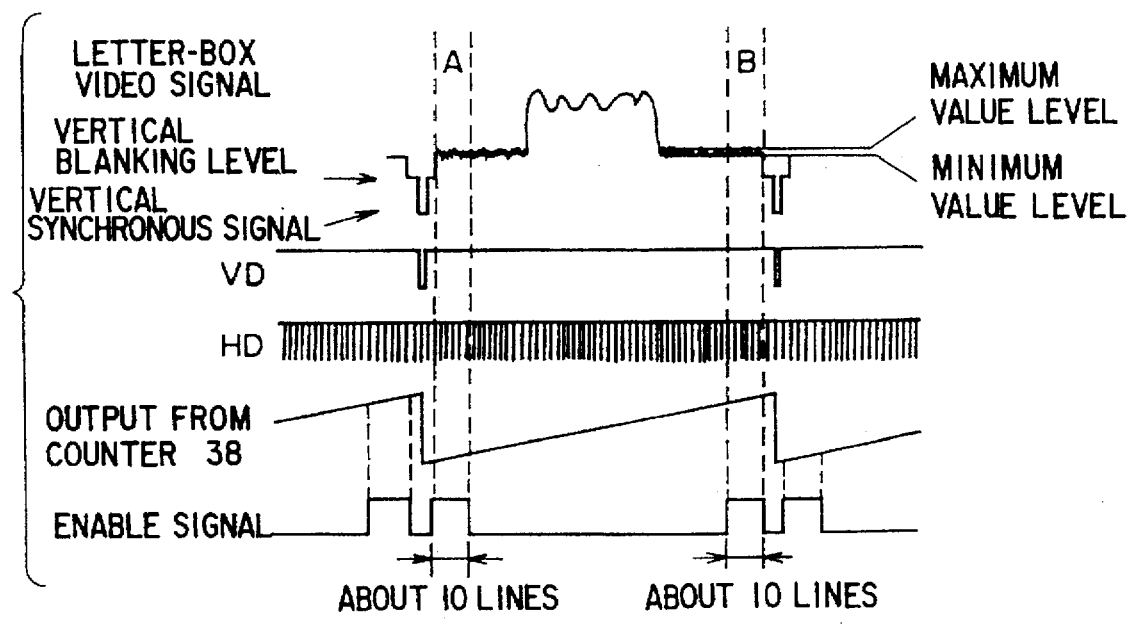
FIG. 21 is a chart showing waveforms so as to explain a period for detecting the maximum and minimum value levels in the third embodiment.

The reference level supplied to the input terminal 36 means an arbitrary threshold level used to determine that the video signal is not a letter-box screen signal. More specifically, this reference level is a threshold level used such that the maximum value level and the minimum value level of the video signal during the H-level period of the enable signal are obtained, as shown in FIG. 21, and the level difference is larger than a certain threshold, it is determined that the video signal is not a letter-box screen signal.

The reference level value changes in accordance with the dynamic range of a video signal level to be determined and is set as a parameter. For example, when the maximum dynamic range of a video signal is represented by 6-bit digital data, the reference level is preferably set at a value of 10 or less.

FIG. 22 shows a generation circuit for generating the enable signal. This enable signal is generated when the number of horizontal lines is counted in the vertical direction by a counter 38, and only a specific horizontal line in this count value is decoded by a decoder 39. More specifically, as shown in FIG. 21, a vertical sync signal VD goes to L level during the vertical sync period to clear the counter 38, and a horizontal sync signal HD is used as a clock for a count-up operation of the counter 38.

In many cases, the upper/lower non-image portion of a letter-box screen is set at several tens lines. For this reason, the decoder 39 generates, on the basis of the count value from the counter 38, an enable signal which goes to H level only during a period corresponding to several upper/lower lines of a video signal where the non-image portion of the letter-box screen is certainly present. More specifically, a period A shown in FIG. 21 appropriately corresponds to ten lines from line number 24, and a period B appropriately corresponds to about ten lines from line number 250. However, the ten lines can be slightly changed without posing any problem.

The maximum value level holding circuit 31 and the minimum value level holding circuit 32 hold the maximum value level and the minimum value level of a video signal, respectively, during the H-level period of the enable signal, i.e., during the periods A and B shown in FIG. 21. The maximum value level holding circuit 31 and the minimum value level holding circuit 32 can be realized with almost the same circuit arrangement. FIG. 23 shows a detailed example of the maximum value level holding circuit 31 and the minimum value level holding circuit 32, which are used for digital processing of a video signal.

The arrangement of the maximum value level holding circuit 31 will be described below with reference to charts of wavelengths shown in FIGS. 24A to 24G. A 6-bit digital video signal shown in FIG. 24A is supplied to an input terminal 40. A clock signal having a predetermined period and shown in FIG. 24B is supplied to an input terminal 41. The digital video signal supplied to the input terminal 40 is latched by a latch circuit 42 in synchronism with the clock signal and output from the latch circuit 42 at a timing shown in FIG. 24E.

The digital video signal output from the latch circuit 42 is supplied to one input terminal of a latch circuit 43 and one input terminal of a comparator 44. The latch content of the latch circuit 43 is reset to zero in accordance with a reset signal as shown in FIG. 24C, which is supplied to an input terminal 45 from the end of the period B to the start of the period A shown in FIG. 21.

The latch circuit 43 latches an output from the latch circuit 42 in synchronism with the clock signal during the H-level period of an output from an AND circuit 46. A latch output from the latch circuit 43, which is shown in FIG. 24F, is supplied to the other input terminal of the comparator 44 and extracted from an output terminal 47.

The comparator 44 performs level comparison between outputs from the latch circuits 42 and 43 and outputs a signal of H level when the output level of the latch circuit 42 is higher than that of the latch circuit 43, as shown in FIG. 24G. An output from the AND circuit 46 goes to H level when the enable signal supplied to the input terminal 33 and shown in FIG. 24D is at H level, and an output from the comparator 44 is at H level.

For this reason, only when the output level of the latch circuit 42 is higher than that of the latch circuit 43, the latch circuit 43 latches the output from the latch circuit 42 in synchronism with the clock signal. Therefore, the maximum value level can be held.

The arrangement of the minimum value level holding circuit 32 will be described below with reference to charts of wavelengths shown in FIGS. 25A to 25G. A 6-bit digital video signal shown in FIG. 25A is supplied to the input terminal 40. A clock signal having a predetermined period shown in FIG. 25B is supplied to the input terminal 41. The digital video signal supplied to the input terminal 40 is latched by the latch circuit 42 in synchronism with the clock signal and output from the latch circuit 42 at a timing shown in FIG. 25E.

The digital video signal output from the latch circuit 42 is supplied to one input terminal of the latch circuit 43 and one input terminal of the comparator 44. The latch content of the latch circuit 43 is reset to the digital maximum value (64 in this case) in accordance with a reset signal shown in FIG. 25C, which is supplied to the input terminal 45 from the end of the period B to the start of the period A shown in FIG. 21.

The latch circuit 43 latches an output from the latch circuit 42 in synchronism with the clock signal during the H-level period of an output from the AND circuit 46. A latch output from the latch circuit 43, which is shown in FIG. 25F, is supplied to the other input terminal of the comparator 44 and extracted from the output terminal 47.

The comparator 44 performs level comparison between outputs from the latch circuits 42 and 43 and outputs a signal of H level when the output level of the latch circuit 42 is lower than that of the latch circuit 43, as shown in FIG. 25G. An output from the AND circuit 46 goes to H level when the enable signal supplied to the input terminal 33 and shown in FIG. 25D is at H level, and an output from the comparator 44 is at H level.

For this reason, only when the output level of the latch circuit 42 is lower than that of the latch circuit 43, the latch circuit 43 latches the output from the latch circuit 42 in synchronism with the clock signal. Therefore, the minimum value level can be held.

The arithmetic circuit 34 shown in FIG. 20 subtracts the minimum value level held by the minimum value level holding circuit 32 from the maximum value level held by the maximum value level holding circuit 31, thereby detecting the level difference. The comparator 35 performs level comparison between the level difference output from the arithmetic circuit 34 and the reference level supplied to the input terminal 36. The comparator 35 outputs a signal of H level when the level difference is less than the reference level, and outputs a signal of L level when the level difference is more than the reference level.

Figure 26:
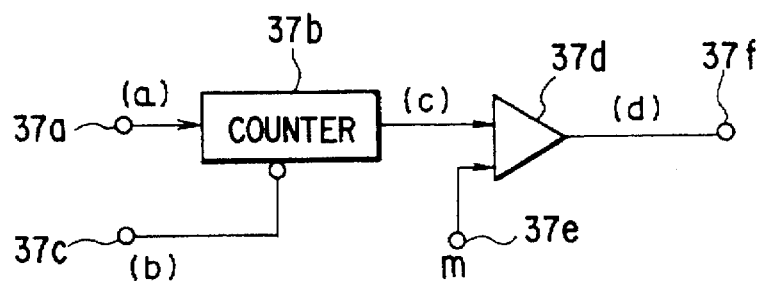
FIG. 26 is a block diagram showing the details of a letter-box determination circuit in the third embodiment.

FIG. 26 shows the details of the letter-box determination circuit 37. An output supplied from the comparator 35 to an input terminal 37a is supplied to a counter 37b. The counter 37b is reset to zero in accordance with a reset signal supplied to an input terminal 37c from the end of the period B to the start of the period A shown in FIG. 21.

The counter 37b counts a state wherein the level difference between the maximum value level and the minimum value level of a video signal is continuously lower than the reference level compared by the comparator 35 during the periods A and B shown in FIG. 21. When the count value is large, the video signal during the periods A and B is flat.

The count value of the counter 37b is supplied to a comparator 37d and compared with a reference value m supplied to an input terminal 37e. When the count value of the counter 37b is larger than the reference value m, the comparator 37d determines a letter-box screen and generates a determination signal of H level. This determination signal is extracted from an output terminal 37f.

Figure 27E:
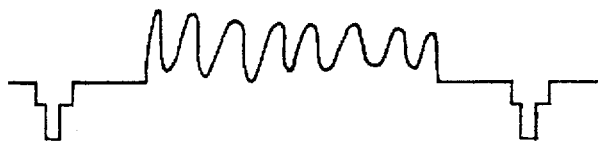
FIGS. 27A to 27E are charts for explaining the operation of the letter-box determination circuit, which is performed when a letter-box screen video signal is supplied.
Figure 27B:
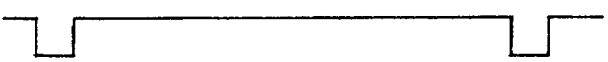
Figure 27A:
Figure 27C:
Figure 27D:

FIGS. 27A to 27D show waveforms at points (a) to (d) in the letter-box determination circuit 37 shown in FIG. 26, which are observed when a letter-box screen video signal shown in FIG. 27E is input. In a letter-box screen, a signal input to the counter 37b has almost the same waveform as that of the enable signal shown in FIG. 21, as shown in FIG. 27A. An output from the counter 37b for counting the duration of the H level changes as shown in FIG. 27C. The count value is compared with the reference value m by the comparator 37d. When the count value is larger than the reference value m, a determination signal of H level is generated, as shown in FIG. 27D.

Figure 28E:
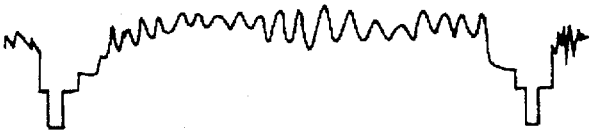
Figure 28A:
Figure 28C:
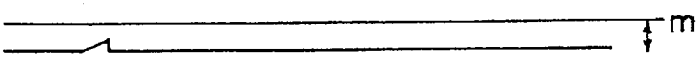
Figure 28D:

FIGS. 28A, 28C, and 28D show waveforms at the points (a), (c), and (d) of the letter-box determination circuit 37 shown in FIG. 26, which are observed when a video signal of a screen with an aspect ratio of 4:3 shown in FIG. 28E is input. In this case, a signal input to the counter 37b rarely has the H-level period, as shown in FIG. 28A. For this reason, an output from the counter 37b for counting the duration of the H level does not become larger than the reference value m, as shown in FIG. 28C. Therefore, a determination signal of L level representing that the video signal is not a letter-box screen signal is generated from the comparator 37d, as shown in FIG. 28D.

According to the arrangement as in the third embodiment, for a letter-box screen video signal, the maximum value level and the minimum value level, which respectively correspond to the upper and lower non-image portions, are detected, and level comparison between the level difference between the two levels and the reference level is performed. When a state in which the level difference is lower than the reference level continues for a time longer than a period corresponding to the reference value m, a letter-box screen is determined. Therefore, even when the letter-box screen has various display forms or a signal level corresponding to an upper/lower non-image portion, and the signal level of the non-image portion is higher than the vertical blanking level, determination of a letter-box screen can be performed at a high accuracy without erroneous determination.

To improve the determination accuracy of the letter-box determination circuit 37, erroneous determination due to noise and the like can be further minimized by making final determination on the basis of continuity of determination results for several fields.

In the third embodiment, determination can be adjusted in accordance with the total brightness of a video, or information of the S/N ratio of a signal. From this viewpoint as well, the performance for letter-box screen determination can be further improved. For example, only when a video has a bright screen as a whole, the determination result can be effective. When the S/N ratio is low, the reference level or the reference value m can be adjusted to minimize erroneous determination.

Figure 29:
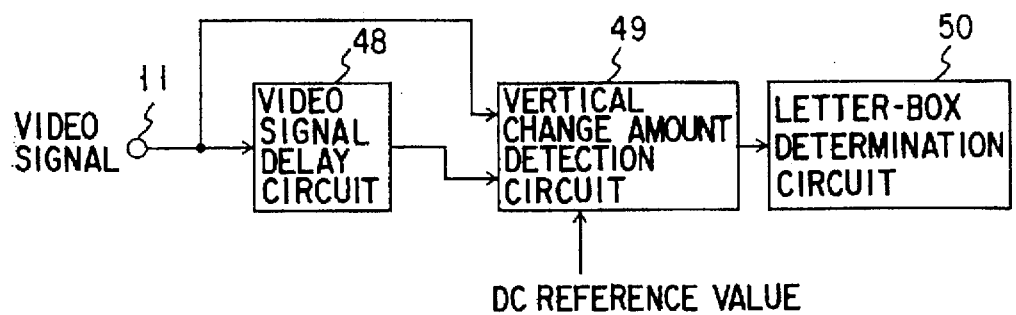
FIG. 29 is a block diagram showing the fourth embodiment of the present invention.

FIG. 29 shows the fourth embodiment of the present invention, in which still another arrangement of the letter-box detection circuit 16 is shown. A video signal supplied to an input terminal 11 is supplied to a video signal delay circuit 48 and a vertical change amount detection circuit 49, and at the same time, directly supplied to the vertical change amount detection circuit 49. The vertical change amount detection circuit 49 detects the level difference between the two inputs and performs level comparison between the level difference and a DC reference level.

The comparison result from the vertical change amount detection circuit 49 is input to a letter-box determination circuit 50. With this operation, it is detected whether a change in signal level in the vertical direction exceeds a predetermine value. In the letter-box determination circuit 50, a line to which this position corresponds is determined.

Figure 30:
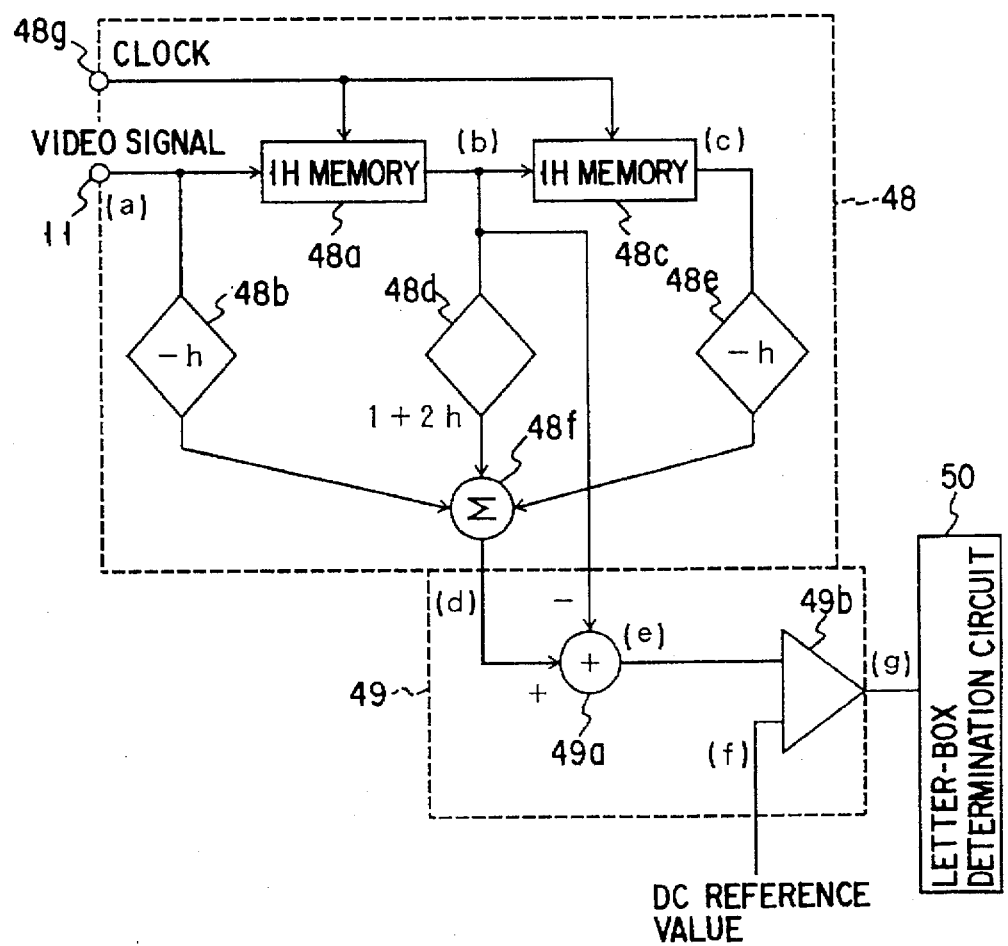
FIG. 30 is a block diagram showing the details of a video signal delay circuit and a vertical change amount detection circuit in the fourth embodiment.

FIG. 30 shows the detail of the video signal delay circuit 48 and the vertical change amount detection circuit 49. The video signal delay circuit 48 has a 1H memory (delay device having a delay amount corresponding to one horizontal line) 48a and a coefficient circuit 48b to which the input terminal 11 is connected. The output terminal of the 1H memory 48a is connected to a 1H memory 48c and a coefficient circuit 48d. The output terminal of the 1H memory 48c is connected to a coefficient circuit 48e. Outputs from the coefficient circuits 48b, 48d, and 48e are input to an adding circuit 48f and added.

An output from the adding circuit 48f and an output from the 1H memory 48a are input to a subtraction circuit 49a constituting the vertical change amount detection circuit 49, and subtraction processing is performed. An output from the subtraction circuit 49a is input to a comparison circuit 49b and level comparison with the DC reference value is performed. An output from the comparison circuit 49b is input to the letter-box determination circuit 50. When an output (g) from the vertical change amount detection circuit 49 is small, this means that the change in level in the vertical direction is small. When the output (g) is large, this means that the change in level in the vertical direction is large. A clock is input from an input terminal 48g and used to drive the 1H memories 48a and 48c.

The video signal delay circuit 48 constitutes a vertical filter using three horizontal lines and can increase the high-frequency component of an extracted signal by increasing a tap coefficient h of the coefficient circuits 48b, 48d, and 48e. In this example, h=2.

Figure 31:
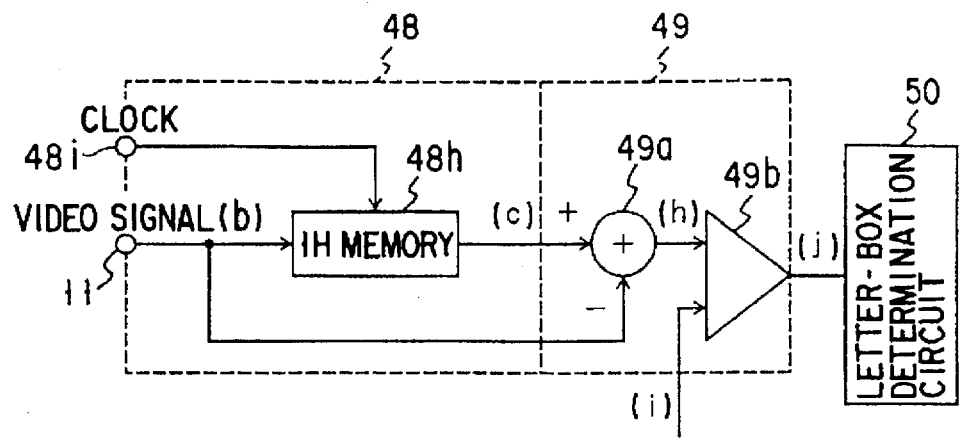
FIG. 31 is a block diagram showing another example of the video signal delay circuit and the vertical change amount detection circuit.

FIG. 31 shows another example of the vertical change amount detection circuit 48 and the vertical change amount detection circuit 49. The video signal delay circuit 48 has a 1H memory 48h to which the input terminal 11 is connected. The 1H memory 48h writes/reads a video signal in synchronism with a clock supplied to an input terminal 48i.

A video signal (b) input to the 1H memory 48h and a signal (c) read out from the 1H memory 48h are input to the subtraction circuit 49a constituting the vertical change amount detection circuit 49. The vertical change amount detection circuit 49 has the same arrangement as that shown in FIG. 30. In this example as well, when an output (j) from the vertical change amount detection circuit 49 is small, this means that the change in level in the vertical direction is small. When the output (j) is large, this means that the change in level in the vertical direction is large.

Figure 32:
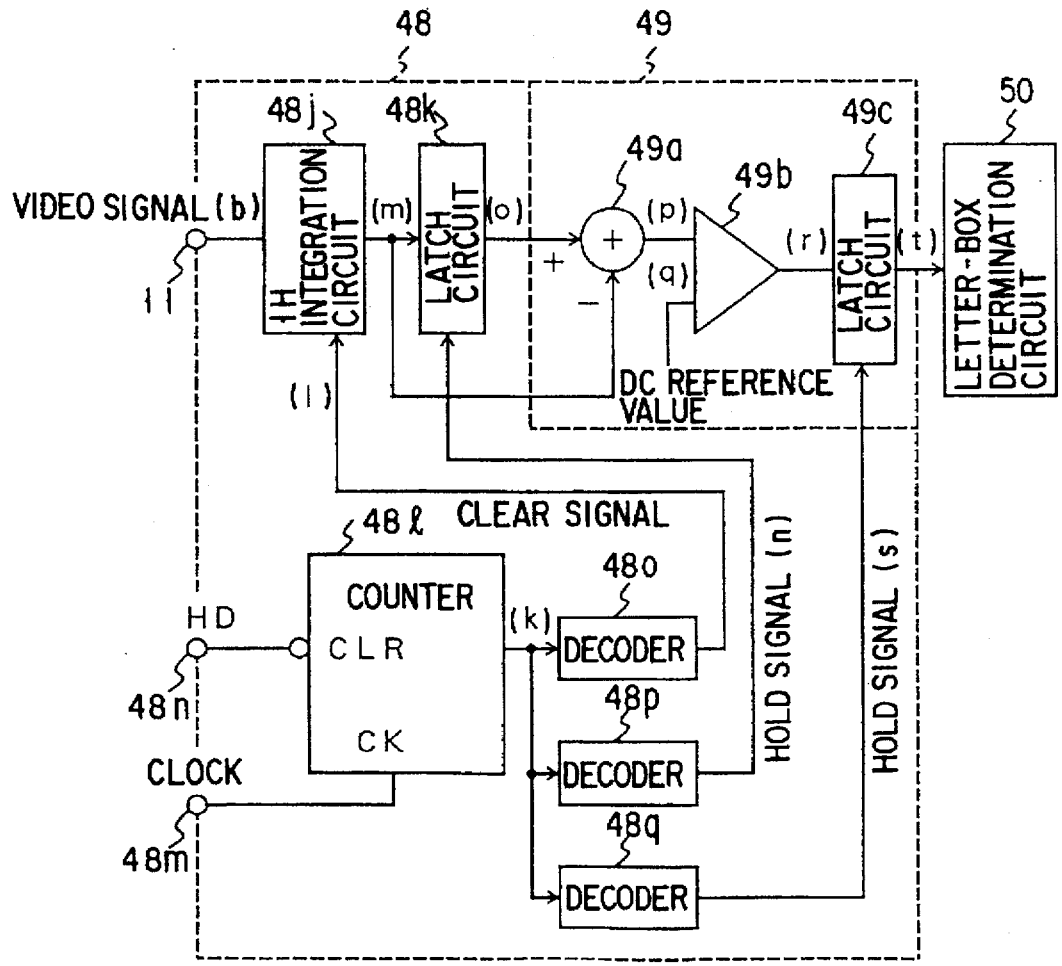
FIG. 32 is a block diagram showing still another example of the video signal delay circuit and the vertical change amount detection circuit.

FIG. 32 shows still another example of the video signal delay circuit 48 and the vertical change amount detection circuit 49. In this example, a video signal supplied to the input terminal 11 is input to a 1H integration circuit 48j constituting the video signal delay circuit 48. An output from the 1H integration circuit 48j is supplied to a latch circuit 48k and the subtraction circuit 49a in the vertical change amount detection circuit 49. An output from the latch circuit 48k is input to the subtraction circuit 49a.

The video signal delay circuit 48 incorporates a counter 48l. A clock is supplied from an input terminal 48m to a clock input terminal CK of the counter 48l, and a horizontal sync signal HD is supplied from an input terminal 48n to a clear input terminal CLR. An output from the counter 48l represents an address in the horizontal direction. An output from the counter 48l is input to decoders 48o, 48p, and 48q and decoded.

An output from the decoder 48o is supplied to the 1H integration circuit 48j as a clear timing signal. An output from the decoder 48p is supplied to the latch circuit 48k as a hold timing signal. An output from the decoder 48q is supplied as a hold timing signal to a latch circuit 49c incorporated in the vertical change amount detection circuit 49 to latch an output from the comparison circuit 49b.

The subtraction circuit 49a in the vertical change amount detection circuit 49 subtracts the output from the 1H integration circuit 48j from the output from the latch circuit 48k. An output from the subtraction circuit 49a is supplied to the comparison circuit 49b. The comparison circuit 49b performs level comparison between the output from the subtraction circuit 49a and the DC reference value and outputs the level difference to the latch circuit 49c. An output from the latch circuit 49c is supplied to the letter-box determination circuit 50.

Figure 33:
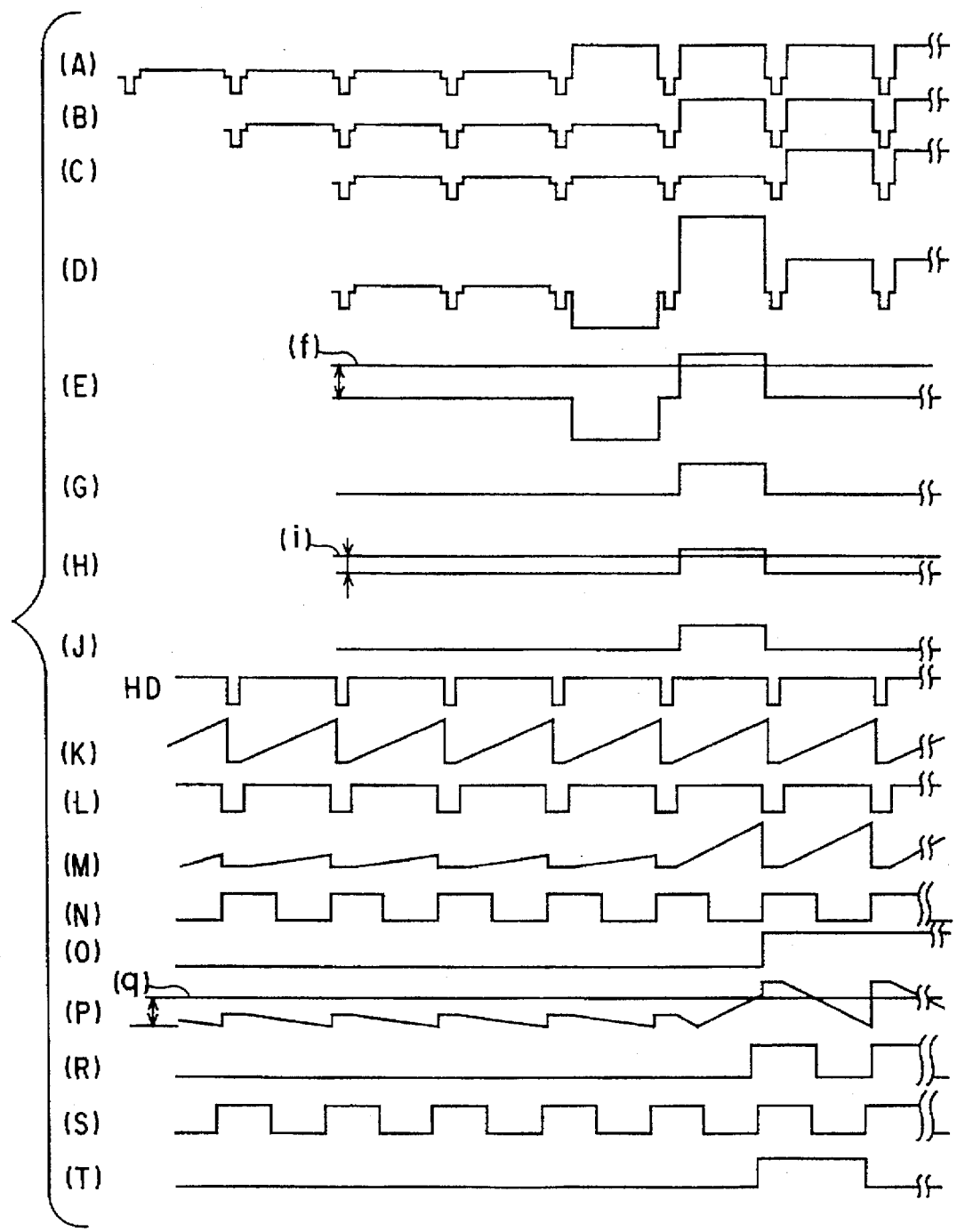
FIGS. 33A to 33T are charts for explaining the operation of the fourth embodiment.

Output waveforms at the respective portions in the arrangements shown in FIGS. 30 to 32 will be described. FIGS. 33A to 33C and FIGS. 34A to 34C show video signals at points (a) to (c) in FIG. 30, respectively. FIGS. 33D and 34D show an output signal [point (d)] from the adding circuit 48f. FIGS. 33E and 34E show an output signal [point (e)] from the subtraction circuit 49a. FIGS. 33G and 34G show an output signal [point (g)] from the comparison circuit 49b, which is output at a portion where the level of the signal (e) is higher than the reference value (f).

FIGS. 33H and 33J and FIGS. 34H and 34J show signals at points (h) and (j) in FIG. 31, respectively. FIGS. 33K to 33P and FIGS. 33R to 33T, and FIGS. 34K to 34P and FIGS. 34R to 34T show signals at points (k) to (p) and points (r) to (t) in FIG. 32, respectively. The horizontal sync signal HD used by the circuit shown in FIG. 32 is shown between FIG. 33J and FIG. 33K, and between FIG. 334J and FIG. 34K.

Figure 6A:
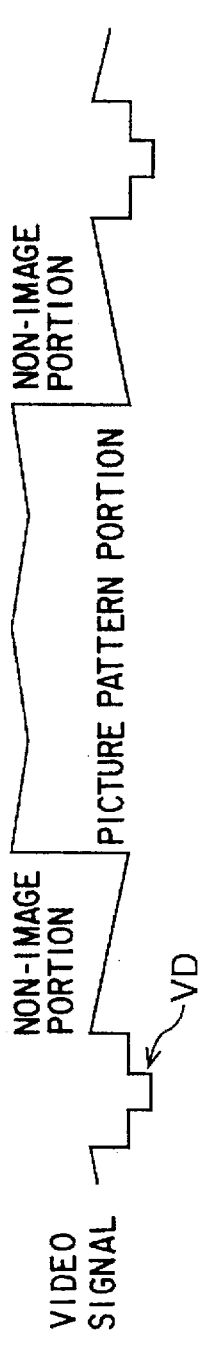
FIGS. 6A to 6C are charts showing waveforms so as to explain various disturbances added to the letter-box screen video signal.
Figure 6B:
Figure 6C:
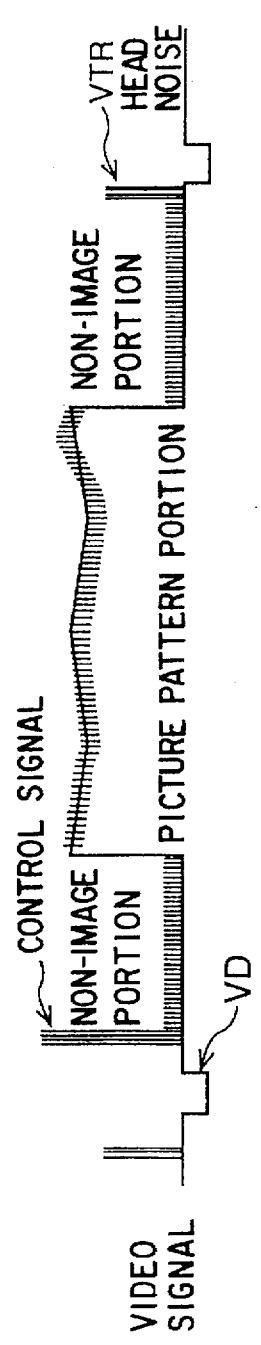
Figure 35:
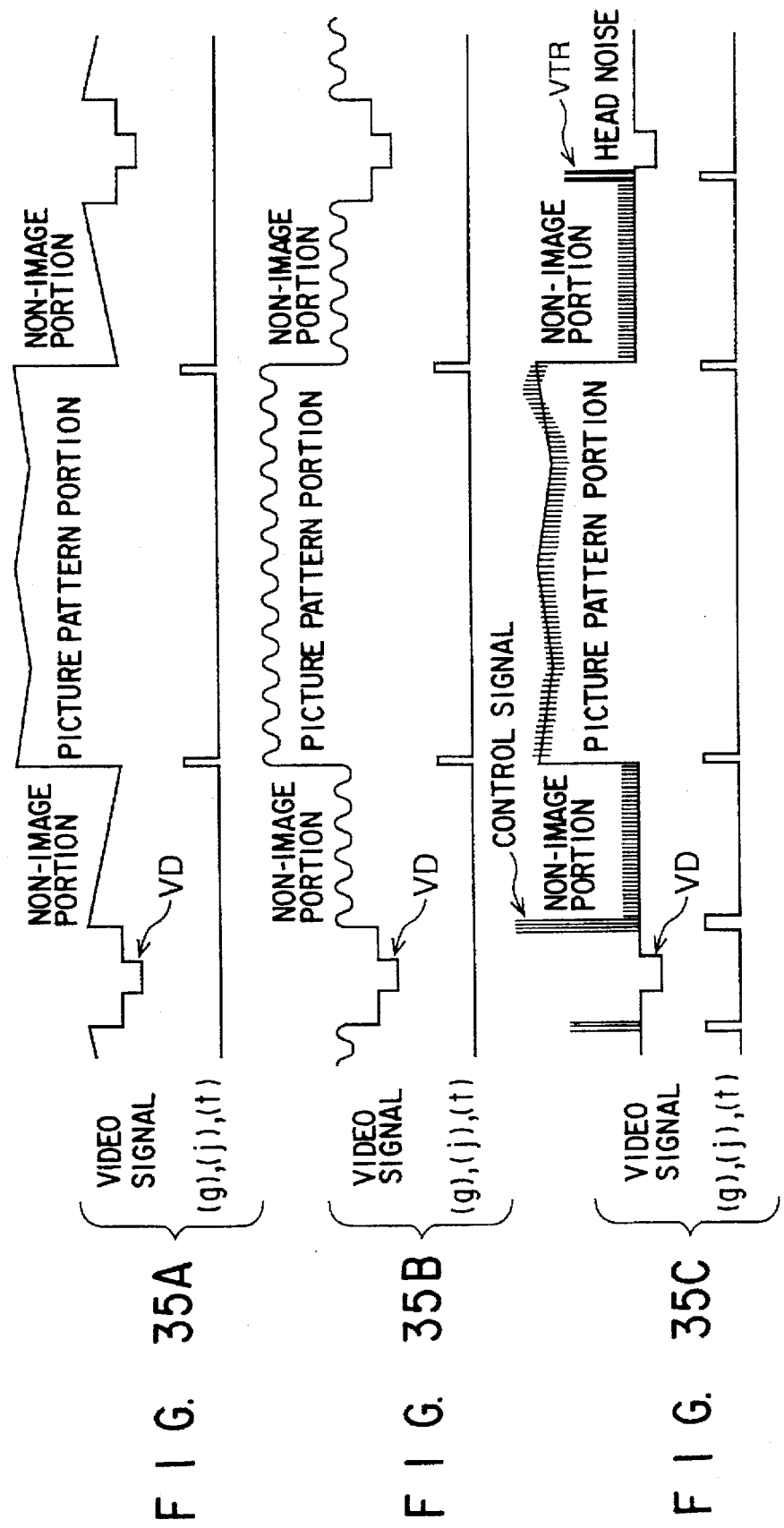
FIGS. 35A to 35C are charts showing outputs upon adding disturbances shown in FIGS. 6A to 6C to the letter-box screen video signal in the fourth embodiment.
Figure 37:
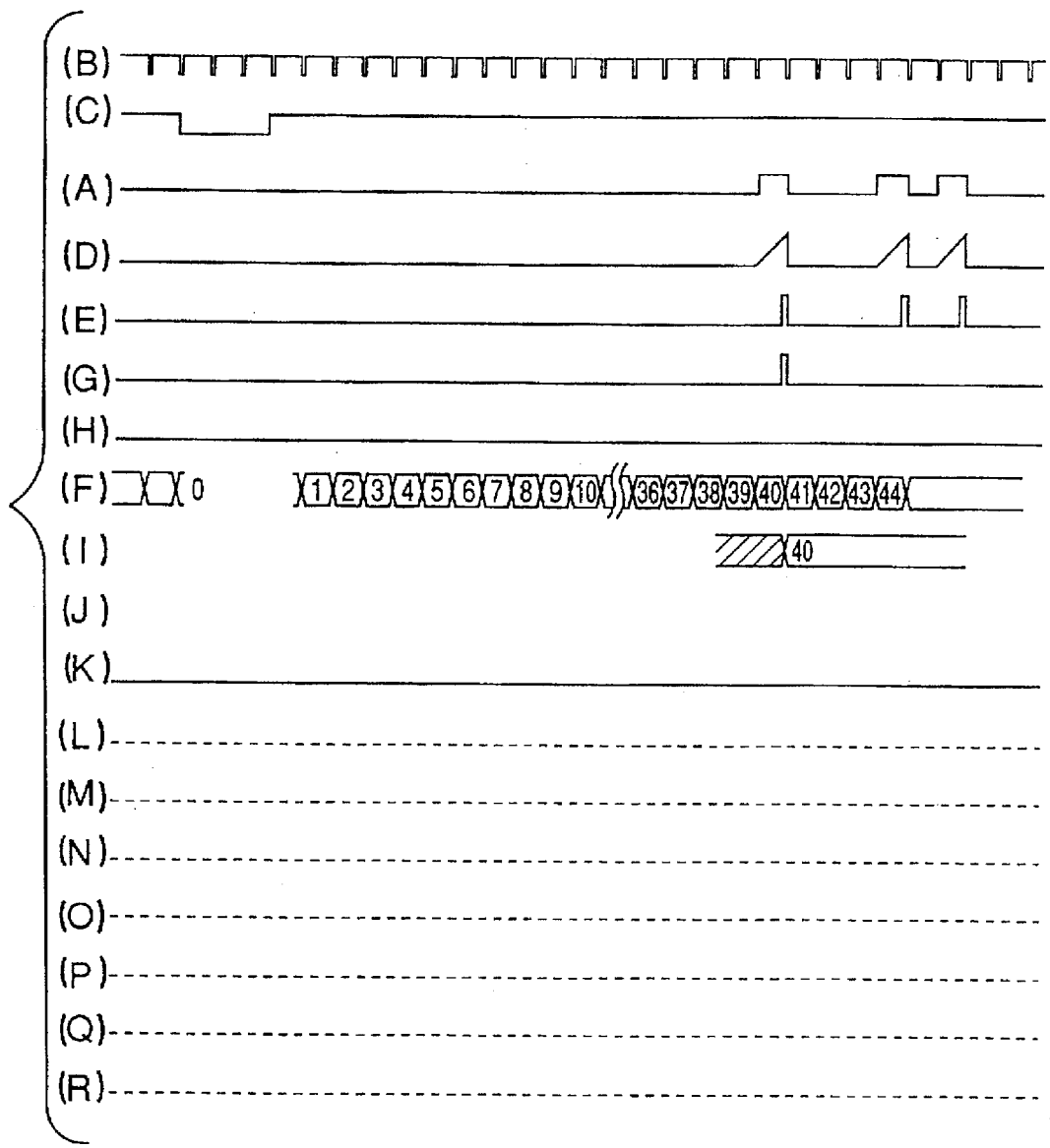
FIGS. 37A to 37R are charts for explaining the operation of the letter-box determination circuit.

FIG. 35A shows an output signal [point (g), (j), or (t)] from the vertical change amount detection circuit 49 shown in FIG. 30, 31, or 32, which is output when the DC component of the video signal varies, as shown in FIG. 6A. FIG. 35B shows an output signal [point (g), (j), or (t)] from the vertical change amount detection circuit 49 shown in FIG. 30, 31, or 32, which is output when noise of an AC component is included in the video signal, as shown in FIG. 6B. FIG. 35C shows an output signal [point (g), (j), or (t)] from the vertical change amount detection circuit 49 shown in FIG. 30, 31, or 32, which is output when noise in head switching is included in the video signal, as shown in FIG. 6C.

In the letter-box determination circuit 50, it is determined whether the output signal from the vertical change amount detection circuit 49, which is obtained in the above manner, appears at almost identical line positions for several fields during a video display period, thereby determining whether a letter-box screen video signal has arrived.

FIG. 36 shows the details of the letter-box determination circuit 50. Reference numeral 50a denotes an input terminal to which a detection signal output from the vertical change amount detection circuit 49 is supplied. The detection signal supplied to the input terminal 50a is supplied to a control input terminal T of a horizontal counter 50b. A clock is supplied to the clock input terminal CK of the counter 50b through an input terminal 50c. The horizontal sync signal HD is supplied to the clear input terminal CLR through an input terminal 50d. The horizontal sync signal HD supplied to the input terminal 50d is supplied to the clock input terminal CK of a vertical counter 50e. The vertical sync signal VD is supplied to the clear input terminal CLR of the counter 50e through an input terminal 50f.

An output from the horizontal counter 50b is decoded by a decoder 50g and supplied to decoders 50h and 50i. An output from the counter 50e is supplied to the decoders 50h, 50i, and 50j. An output from the counter 50e, which represents a vertical line position, is supplied to latch circuits 50k and 50l and latched in accordance with latch pulses G and H from the decoders 50h and 50i. Outputs from the latch circuits 50k and 50l are input to latch circuits 50m and 50n, respectively. Outputs from the latch circuits 50m and 50n are input to latch circuits 50o and 50p, respectively. As a latch pulse for the latch circuits 50m to 50p, an output from the decoder 50j is used.

Outputs from the latch circuits 50m and 50o are input to a comparison circuit 50q. When the two inputs are equal to each other, an output of H level is obtained from the comparison circuit 50q. Outputs from the latch circuits 50n and 50p are input to a comparison circuit 50r. When the two inputs are equal to each other, an output of H level is obtained from the comparison circuit 50r. Outputs from the comparison circuits 50q and 50r are input to an AND circuit 50s. An output from the AND circuit 50s is extracted from an output terminal 50t as a letter-box determination output. Therefore, when the output is at H level, a letter-box screen determination result is obtained.

FIGS. 37A to 37R and FIGS. 38A to 38R show waveforms at points (A) to (R) in FIG. 36. When the detection signal [point (A)] is at H level, the counter 50b performs a counting operation. When this count value level [point (D)]

is higher than a predetermined level, an output [point (E)] from the decoder 50g is at H level. This processing corresponds to extraction of the horizontal line position at the boundary between an upper/lower non-image portion and an image portion of a letter-box screen. The count value of the counter 50b is not incremented at a portion without any abrupt change in level in the vertical direction, so detection by the decoder 50g is not performed.

In a mask area at the upper portion of the screen, when a signal [point (E)] goes to H level, and the horizontal line count value of the counter 50e falls within a predetermined value range, the decoder 50h generates a latch output [point (G)] and causes the latch circuit 50k to latch the line number at this time. On the other hand, in the mask area at the lower portion of the screen, when the signal [point (E)] goes to H level, and the horizontal line count value of the counter 50e falls within a predetermined value range, the decoder 50i generates a latch output [point (H)] and causes the latch circuit 50l to latch the line number at this time.

The line numbers held by the latch circuits 50k and 50l are latched by the latch circuits 50m and 50n, respectively, at the timing of a timing signal [point (K)] obtained from the decoder 50j. This timing signal [point (K)] is obtained in units of fields. Eventually, the line numbers of the upper portion of the screen in preceding and subsequent fields are held by the latch circuits 50m and 50o. In addition, the line numbers of the lower portion of the screen in preceding and subsequent fields are held by the latch circuits 50n and 50p.

When an output from the comparison circuit 50q is at H level (i.e., the line numbers of the upper portion of the screen in preceding and subsequent fields are identical), and an output from the comparison circuit 50r is at H level (i.e., the line numbers of the lower portion of the screen in preceding and subsequent fields are identical), a determination output at H level (a letter-box screen is present) is obtained from the AND circuit 50s.

The present invention is not limited to the above embodiments, and various changes and modifications can also be made and implemented without departing from the spirit and scope of the invention.

Industrial Applicability

As has been described above in detail, according to the present invention, an excellent letter-box screen detection apparatus which can properly determine the presence/absence of a non-image portion and can determine a letter-box screen at a high accuracy can be provided. Therefore, there is high applicability to a video display apparatus such as wide TV sets and video tape recorders.

We claim:

1. A letter-box screen detection apparatus characterized by comprising delay means for delaying a video signal by a predetermined number of horizontal lines, vertical change amount detection means for calculating a difference between the video signal input to said delay means and the video signal delayed by said delay means and comparing a difference value with a predetermined reference value to detect a non-image portion of the video signal, and determination means for determining a letter-box screen when a state detected by said vertical change amount detection means as said non-image portion is obtained at identical horizontal line positions for several continuous fields.

2. A letter-box screen detection apparatus according to claim 1, characterized by comprising control means for controlling a horizontal amplitude or a vertical amplitude of the video signal on the basis of a result of said determination means.

3. A letter-box screen detection apparatus according to claim 1, characterized in that said delay means is a vertical filter.

4. A letter-box screen detection apparatus according to claim 1, characterized in that said delay means is one-line delay means.

5. A letter-box screen detection apparatus according to claim 1, characterized in that said delay means comprises integration means for integrating the video signal in units of the horizontal lines, and first holding means for holding an output from said integration means for one horizontal line period, and said vertical change amount detection means comprises subtraction means for calculating a difference between the output from said integration means and an output from said first holding means, comparison means for comparing a difference output from said subtraction means with a reference DC value to obtain a detection output representing that the difference exceeds the DC value, and second holding means for holding an output from said comparison means for one horizontal period.

6. A letter-box screen detection apparatus according to claim 1, characterized in that said determination means comprises first latch means for latching horizontal line number information when a detection output representing said non-image portion is obtained from said vertical change amount detection means in a region at an upper portion of a screen, second latch means for latching the horizontal line number information when the detection output representing the non-image portion is obtained from said vertical change amount detection means in a region at a lower portion of said screen, first comparison means for shifting an output from said first latch means in units of fields and determining whether line number information having the same content is obtained in each field, second comparison means for shifting an output from said second latch means in units of fields and determining whether line number information having the same content is obtained in each field, and gate means for obtaining a determination output representing a letter-box screen signal when comparison results representing that pieces of the line number information having the same contents are latched are output from both of said first and second comparison means.

* * * * *